(12) United States Patent
Igarashi et al.

(10) Patent No.: US 8,514,436 B2
(45) Date of Patent: Aug. 20, 2013

(54) IMAGE FORMING APPARATUS AND PRINT CONTROL METHOD, AND PROGRAM PRODUCT

(75) Inventors: Masaaki Igarashi, Saitama (JP); Hozumi Yonezawa, Tokyo (JP); Hiroshi Gotoh, Tokyo (JP); Takeshi Yoshizumi, Tokyo (JP); Osamu Inoue, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 392 days.

(21) Appl. No.: 12/775,836

(22) Filed: May 7, 2010

(65) Prior Publication Data
US 2010/0290082 A1 Nov. 18, 2010

(30) Foreign Application Priority Data

May 14, 2009 (JP) .................................. 2009-117714
Mar. 18, 2010 (JP) .................................. 2010-063236

(51) Int. Cl.
*G06F 15/00* (2006.01)

(52) U.S. Cl.
USPC .............. 358/1.15; 358/1.13; 358/448; 347/4

(58) Field of Classification Search
None
See application file for complete search history.

(56) References Cited

U.S. PATENT DOCUMENTS

| | | | |
|---|---|---|---|
| 6,552,813 B2 * | 4/2003 | Yacoub ........................... | 358/1.1 |
| 6,591,297 B1 * | 7/2003 | Challener et al. .............. | 709/224 |
| 2003/0133146 A1 * | 7/2003 | Parry ............................. | 358/1.15 |
| 2005/0099438 A1 * | 5/2005 | Lester et al. .................... | 347/4 |
| 2006/0066901 A1 * | 3/2006 | Sugita ............................ | 358/1.15 |
| 2006/0238799 A1 * | 10/2006 | Kidokoro ....................... | 358/1.15 |
| 2006/0244991 A1 * | 11/2006 | Tenger et al. .................. | 358/1.15 |
| 2007/0024895 A1 * | 2/2007 | Clark ............................ | 358/1.15 |
| 2007/0091356 A1 * | 4/2007 | Kremer ......................... | 358/1.15 |
| 2007/0139702 A1 * | 6/2007 | Sato et al. ..................... | 358/1.15 |
| 2008/0316524 A1 * | 12/2008 | Lefebvre et al. ............. | 358/1.15 |
| 2009/0091783 A1 * | 4/2009 | Kazume et al. ............... | 358/1.15 |
| 2009/0174895 A1 * | 7/2009 | Huster .......................... | 358/1.15 |
| 2009/0201551 A1 * | 8/2009 | Uchida ......................... | 358/1.15 |
| 2009/0217268 A1 * | 8/2009 | Pandit et al. .................. | 718/100 |
| 2009/0257082 A1 * | 10/2009 | Kohli et al. ................... | 358/1.15 |
| 2009/0324069 A1 * | 12/2009 | Kawai ........................... | 382/165 |
| 2010/0027065 A1 * | 2/2010 | Koakutsu ...................... | 358/1.15 |

FOREIGN PATENT DOCUMENTS

JP 2005-235234 9/2005

* cited by examiner

*Primary Examiner* — Twyler Haskins
*Assistant Examiner* — Helen Q Zong
(74) *Attorney, Agent, or Firm* — Oblon, Spivak, McClelland, Maier & Neustadt, L.L.P.

(57) ABSTRACT

A printer includes a first receiving unit that receives a print job containing a printing requirement, where the printing requirement is set as either an indispensable requirement that is indispensable for executing the print job or a desired requirement that is desirable for executing the print job; a second receiving unit that receives, from each of external image forming apparatuses connected to the image forming apparatus via a network, a printability level indicating whether the external image forming apparatus has a printing function satisfying the indispensable requirement or a printing function satisfying the desired requirement; a selecting unit that selects an image forming apparatus that executes the print job from the external image forming apparatuses by checking the printability level; and a print-operation control unit that sends the print job to the selected image forming apparatus and causes the selected image forming apparatus to execute the print job.

14 Claims, 23 Drawing Sheets

FIG. 3

| IP ADDRESS OF HIGHER-LEVEL PRINTER | STATUS |
|---|---|
| IP ADDRESS OF LOWER-LEVEL PRINTER | STATUS |

FIG. 4

- JOB ID
- NUMBER OF PRINTED PAGES (TOTAL)

- NUMBER OF PRINTERS (TOTAL)
- IP ADDRESS OF HIGHER-LEVEL PRINTER
- JOB ID ASSIGNED TO HIGHER-LEVEL PRINTER
- NUMBER OF PAGES PRINTED BY HIGHER-LEVEL PRINTER

- NUMBER OF PRINTERS (TOTAL)
- IP ADDRESS OF LOWER-LEVEL PRINTER
- JOB ID ASSIGNED TO LOWER-LEVEL PRINTER
- NUMBER OF PAGES PRINTED BY LOWER-LEVEL PRINTER

FIG. 5

| FUNCTION NAME | STATUS |
|---|---|
| DUPLEX PRINTING | SUPPORTED |
| STAPLING | SUPPORTED |
| PUNCHING | N/A |
| SHEET SIZE | A4 AND A3 |
| SHEET TYPE | NORMAL PAPER AND USED PAPER |

FIG. 6

| MUST REQUIREMENTS | • A4<br>• NORMAL PAPER |
|---|---|
| WANT REQUIREMENTS | • DUPLEX PRINTING<br>• STAPLING |

| PRINTABILITY LEVEL | COMPLETELY ACCORDANT/ PARTIALLY ACCORDANT/ NOT ACCORDANT |

| ID | PRINTABILITY LEVEL | SELECTED PRINTER INFORMATION |
|---|---|---|
| MAIN | PARTIALLY ACCORDANT | |
| PRINTER 1 | COMPLETELY ACCORDANT | PRINTER THAT EXECUTES PRINT JOB |
| PRINTER 2 | COMPLETELY ACCORDANT | |

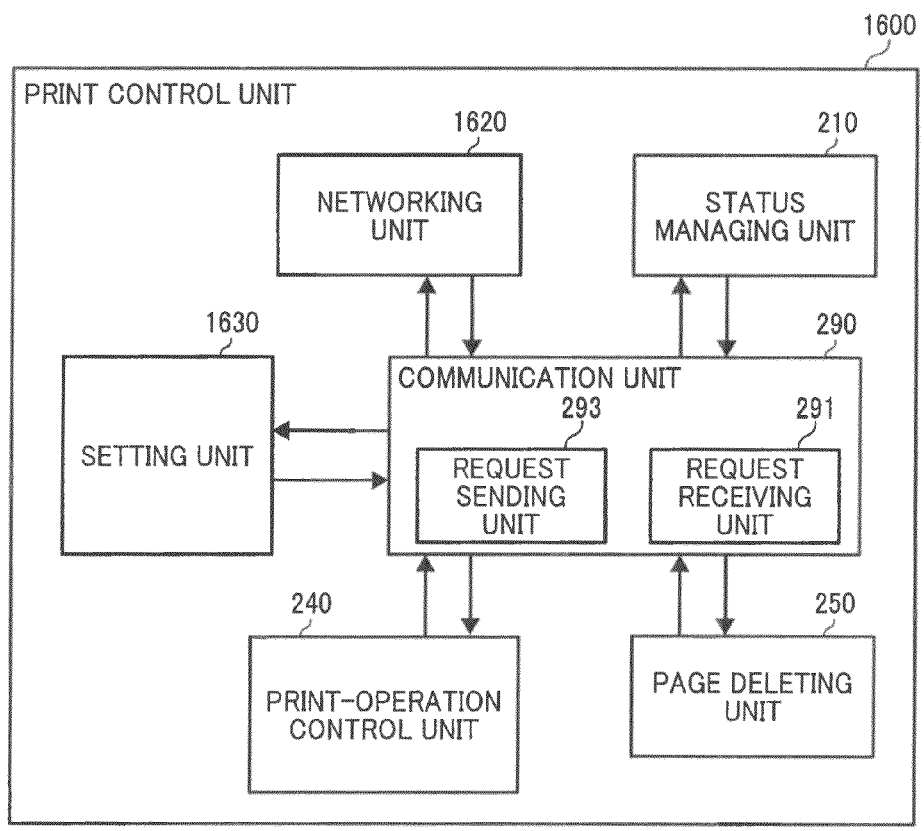

IMAGE FORMING APPARATUS AND PRINT CONTROL METHOD, AND PROGRAM PRODUCT

CROSS-REFERENCE TO RELATED APPLICATIONS

The present application claims priority to and incorporates by reference the entire contents of Japanese Patent Application No. 2009-117714 filed in Japan on May 14, 2009 and Japanese Patent Application No. 2010-063236 filed in Japan on Mar. 18, 2010.

BACKGROUND OF THE INVENTION

1. Field of the Invention

The present invention relates to an image forming apparatus, a print control method, and a program product.

2. Description of the Related Art

Substitutive printing is a well-known technology that allows, when a first image forming apparatus receives a print job, a second image forming apparatus that is connected to the first image forming apparatus via a network or similar executes the print job. The substitutive printing makes it possible to select an image forming apparatus that executes a requested job from among, for example, a plurality of image forming apparatuses that have different functions and to execute the job using the selected image forming apparatus.

For example, Japanese Patent Application Laid-open No. 2005-235234 discloses a print control device, etc., that ranks printers in a particular order and selects the printer that executes the print job in accordance with the order. When a specified printer cannot execute the print job, the print control device that is disclosed in Japanese Patent Application Laid-open No. 2005-235234 selects an alternative printer in accordance with the order and requests the alternative printer to execute the print job.

However, in the print control device, etc., disclosed in Japanese Patent Application Laid-open No. 2005-235234, even if, from the perspective of the user, there are various degrees of importance for each function specified by the print job, the degree of user-specified importance is not taken into consideration. If the function's degree of system-specified importance, which is represented by the order of the printers, is not accordant with the function's degree of user-specified importance, a function with a high degree of user-specified importance may not be implemented.

SUMMARY OF THE INVENTION

It is an object of the present invention to at least partially solve the problems in the conventional technology.

According to an aspect of the present invention, there is provided an image forming apparatus that includes a first receiving unit that receives a print job that contains a printing requirement, where the printing requirement is set as either an indispensable requirement that is indispensable for executing the print job or a desired requirement that is desirable for executing the print job; a second receiving unit that receives, from each of a plurality of external image forming apparatuses connected to the image forming apparatus via a network, a printability level that indicates whether the external image forming apparatus has a printing function that satisfies the indispensable requirement or a printing function that satisfies the desired requirement; a selecting unit that selects an image forming apparatus that executes the print job from the external image forming apparatuses by checking the printability level; and a print-operation control unit that sends the print job to the selected image forming apparatus and causes the selected image forming apparatus to execute the print job.

According to another aspect of the present invention, there is provided a print control method performed by an image forming apparatus. The image forming apparatus includes a first receiving unit, a second receiving unit, a selecting unit, and a print-operation control unit. The print control method includes receiving a print job that contains a printing requirement by the first receiving unit, where the printing requirement is set as either an indispensable requirement that is indispensable for executing the print job or a desired requirement that is desirable for executing the print job; receiving, from each of a plurality of external image forming apparatuses connected to the image forming apparatus via a network, a printability level that indicates whether the external image forming apparatus has a printing function that satisfies the indispensable requirement or a printing function that satisfies the desired requirement by the second receiving unit; selecting, using the selecting unit, an image forming apparatus that executes the print job from the external image forming apparatuses by checking the printability level; and sending, under control of the print-operation control unit, the print job to the selected image forming apparatus, thereby causing the selected image forming apparatus to execute the print job.

According to still another aspect of the present invention, there is provided a computer product that causes a computer to execute the method according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic diagram of the structure of online printer information;

FIG. 4 is a schematic diagram of the structure of page information;

FIG. 5 is a schematic diagram of the structure of function information;

FIG. 6 is a schematic diagram of the structure of information containing printing requirements;

FIG. 16 is a block diagram of the functional configuration of a print control unit according to the second embodiment;

FIG. 17 is a schematic diagram of the structure of printability level information according to the second embodiment;

DETAILED DESCRIPTION OF THE PREFERRED EMBODIMENTS

Exemplary embodiments of an image forming apparatus, a print control method, and a program product print control program according to the present invention are described in detail below with reference to the accompanying drawings.

First Embodiment

Figure 1:
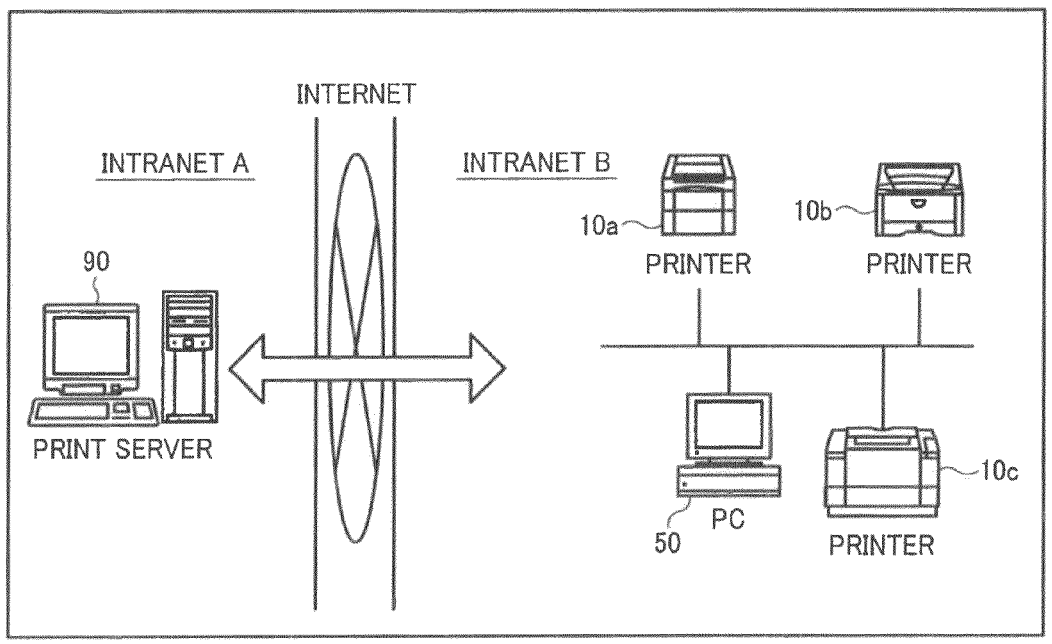
FIG. 1 is a schematic diagram of the configuration of a print control system that includes an image forming apparatus that includes a print control device according to the first embodiment.

FIG. 1 is a schematic diagram of the configuration of a print control system that includes an image forming apparatus that includes a print control device according to the present embodiment. As shown in FIG. 1, the print control system includes an intranet A and an intranet B that are connected to each other via the Internet.

The intranet A includes a print server 90. The print server 90 receives a print job from a personal computer (PC) that is connected to an intranet or the like and outputs the print job to a printer. The print server 90 receives status information etc., from the printer and manages the received status information.

The intranet B includes printers 10a, 10b, and 10c and a PC 50. Any of the printers 10a, 10b, and 10c can execute the print job. In the example shown in FIG. 1, for example, the printer 10a is a main printer; the printers 10b and 10c are sub printers that can execute a print job that is received by the printer 10a.

The PC 50 outputs the print job to the print server 90.

Figure 2:
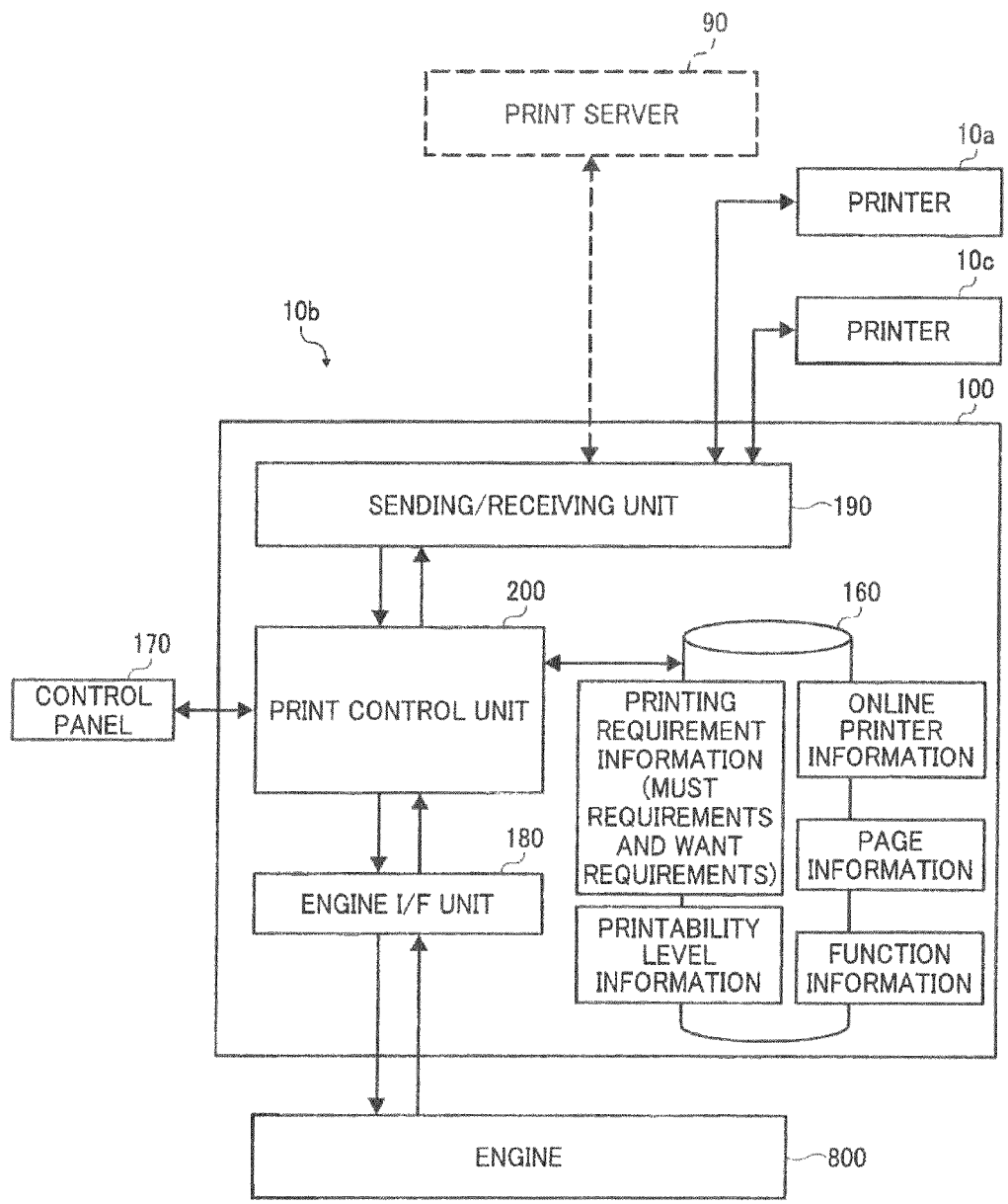
FIG. 2 is a block diagram of the general configuration of a printer according to the first embodiment.

FIG. 2 is a block diagram of the general configuration of the printer 10b. The printer 10b is connected to the print server 90 and the printers 10a and 10c. In the example shown in FIG. 2, the printer 10a is a higher-level printer of the printer 10b; the printer 10c is a lower-level printer of the printer 10b.

The "higher-level printer" is a printer that is upstream with respect to data flow during the recovery printing and sends a print job request to the printer 10b. The "lower-level printer" is a printer that is downstream with respect to data flow during the recovery printing and receives a print job request from the printer 10b. The most-upstream printer with respect to the data flow during the recovery printing is called "main printer" and the other printers are called "sub printers". The functional configuration of the main printer can be the same as that of the sub printers. Some of processes performed by the main printer during the recovery printing are different from processes performed by the sub printers.

The printer 10b includes a controller 100, a control panel 170, and an engine 800. The controller 100 controls the units of the printer 10b, thereby implementing the printer functions. The control panel 170 is made up of a liquid-crystal touch panel (not shown), control buttons (not shown), etc. The control panel 170 displays various screens on the liquid-crystal touch panel and receives user instructions via the screen or the control buttons. The engine 800 forms an image on a medium and outputs the image in accordance with an instruction received from the controller 100.

The controller 100 includes a sending/receiving unit 190, a print control unit 200, a storage unit 160, and an engine I/F unit 180.

The sending/receiving unit 190 communicates with the print server 90 and the other printers. The sending/receiving unit 190 sends and receives a print job request. The sending/receiving unit 190 sends various signals to the higher-level printer, such as a signal indicative of the status of the printer 10b, a signal indicative of the status of the lower-level printer, a printer assignment response, and a printer release response.

The print control unit 200 controls various print jobs including a print job that is executed by an external printer. Upon receiving information from an external device, for example, the print server 90 via the sending/receiving unit 190, the print control unit 200 processes information. The print control unit 200 sends requests for the status information etc. to the printer 10a or 10b via the sending/receiving unit 190.

The engine I/F unit 180 is an interface that connects the printer 10b to the engine 800. The engine I/F unit 180 outputs control commands and image data to be printed to the engine 800.

The storage unit 160 stores therein information to be processed by the printer 10b. The storage unit 160 stores therein online printer information, page information, function information, information containing printing requirements, and printability level information.

The online printer information is data concerning the higher-level printer or the lower-level printer with respect to data flow during the recovery printing. FIG. 3 is a schematic diagram of the structure of the online printer information. As shown in FIG. 3, the online printer information contains the IP address of the higher-level printer and the IP address of the lower-level printer. The online printer information preferably contains both the IP addresses and the statuses of the higher-level printer and the lower-level printer. As shown in FIG. 3, the online printer information contains, in an associated manner, both the IP address and the status of each of the higher-level printer and the lower-level printer.

The page information is data concerning printed pages of the print job. FIG. 4 is a schematic diagram of the structure of the page information. As shown in FIG. 4, the page information contains the job ID of the print job and the number of printed pages. The page information further contains information about printers that are in connection during the recovery printing. The information about the printers contains the number of printers that concern the print job, the IP address of the higher-level printer, the IP address of the lower-level printer, the job ID of a print job executed by the higher-level printer, the job ID of a print job executed by the lower-level printer, the number of pages printed by the higher-level printer, and the number of pages printed by the lower-level printer.

The function information is information containing functions available by the printer 10b. FIG. 5 is a schematic diagram of the structure of the function information. As shown in FIG. 5, the function information contains, for example, whether the duplex printing is supported, whether the stapling or the punching is supported, the available sheet sizes, and the available sheet types.

The printing requirement information contains requirements about functions specified by the print job, each of which is set as either "MUST requirement" or "WANT requirement". The MUST requirement is a function that is indispensable for executing the print job. The WANT requirement is a function that is desirable for executing the print job. Although the WANT requirement is specified by the print job, the WANT requirement is not satisfied depending on the functions of the printer. FIG. 6 is a schematic diagram of the structure of information containing the printing requirements.

Figures 7, 8:
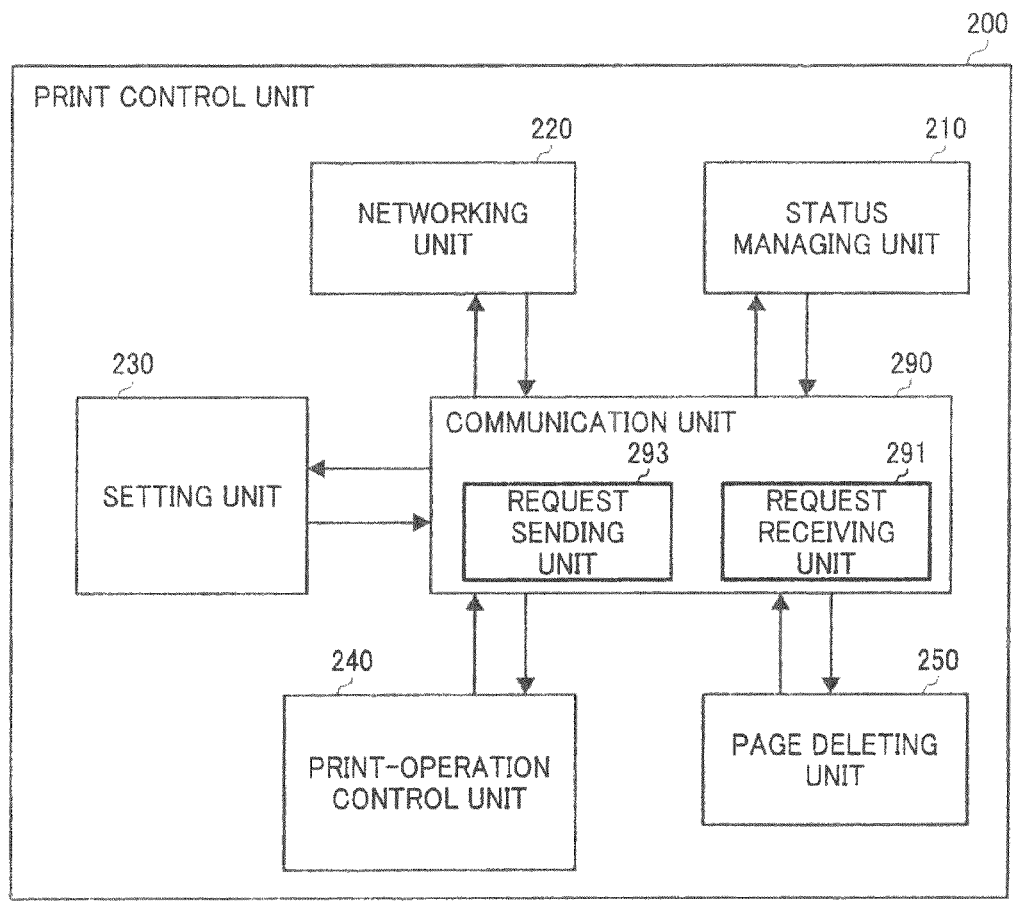
FIG. 7 is a schematic diagram of the structure of printability level information.
FIG. 8 is a block diagram of the functional configuration of a print control unit according to the first embodiment.

The printability level information is information containing a printability level that indicates whether the printer has the functions that satisfy the MUST requirements specified by the print job or the functions that satisfy the WANT requirements specified by the print job. FIG. 7 is a schematic diagram of the structure of the printability level information. If the printer has both the functions that satisfy the MUST requirements and the functions that satisfy the WANT requirements, then the printability level is set to "completely accordant". If the printer has only the functions that satisfy the MUST requirements, then the printability level is set to "partially accordant". If the printer has neither the functions that satisfy the MUST requirements nor the functions that satisfy the WANT requirements, then the printability level is set to "not accordant".

FIG. 8 is a block diagram of the functional configuration of the print control unit 200. The print control unit 200 includes a status managing unit 210, a networking unit 220, a setting unit 230, a print-operation control unit 240, a page deleting unit 250, and a communication unit 290.

The status managing unit 210 manages the status information assigned to the printer 10b. The status information indicates whether the printer 10b is in printing, unprintable status, or printable status. The status information is output from the engine I/F unit 180. The status managing unit 210 updates the status information each time when the status of the printer 10b changes.

The networking unit 220 sets the higher-level printer in accordance with management information that is stored in an external storage device (not shown). The networking unit 220 sets a printer that is located lower than the printer 10b as the lower-level printer to be connected thereto in accordance with the status information contained in the management information. If two or more printers that are lower than the printer 10b are found in the management information, the networking unit 220 selects one printer from the found printers as the lower-level printer. The information about the set higher-level printer and the set lower-level printer is stored in the storage unit 160 as the online printer information.

The setting unit 230 determines whether the printer 10b has the necessary functions specified by the print job by comparing the function information assigned to the printer 10b with the functions that satisfy the MUST requirements and the functions that satisfy the WANT requirements. If the printer has both the functions that satisfy the MUST requirements specified by the print job and the functions that satisfy the WANT requirements specified by the print job, then the printability level of the printer is set to "completely accordant level"; if the printer has only the functions that satisfy the MUST requirements, the printability level of the printer is set to "partially accordant level"; and if the printer has neither the functions that satisfy the MUST requirements nor the functions that satisfy the WANT requirements, then the printability level of the printer is set to "not accordant level". In this manner, each printer is set to any of the three printability levels.

The setting unit 230 obtains the printability level of the lower-level printer. The setting unit 230 creates a list of printability levels including that of the printer 10b.

The networking unit 220 works as a selecting unit that selects the printer that executes the requested print job by referring to the list of printability levels. The networking unit 220 according to the present embodiment selects, as the printer that executes the print job, the highest-level printer out of completely accordant printers that have both the functions that satisfy the MUST requirements and the functions that satisfy the WANT requirements by referring to the list of printability levels. If no completely accordant printer is present, the setting unit 230 selects, as the printer that executes the print job, the highest printer out of partially accordant printers that have only the functions that satisfy the MUST requirements.

The print-operation control unit 240 performs a process for setting the printer 10b to printable. This process is performed when a printer enable command is received. When the printer 10b is set to printable, the printer 10b starts printing. The print-operation control unit 240 sends a printer disable command to the lower-level printer.

The page deleting unit 250 manages printed pages information that is managed by the main printer during the networking process. The printed page information is accumulation of a page delete notification received from the lower-level printer and a page delete notification of the printer 10b. The printed pages are managed in this manner.

The communication unit 290 sends/receives requests to/from the printers that are connected to the printer 10b, the print server, and the like.

The communication unit 290 includes a request receiving unit 291 and a request sending unit 293. The request receiving unit 291 receives requests from the higher-level printer and the print server. The request sending unit 293 sends a request to the lower-level printer.

Figure 9:
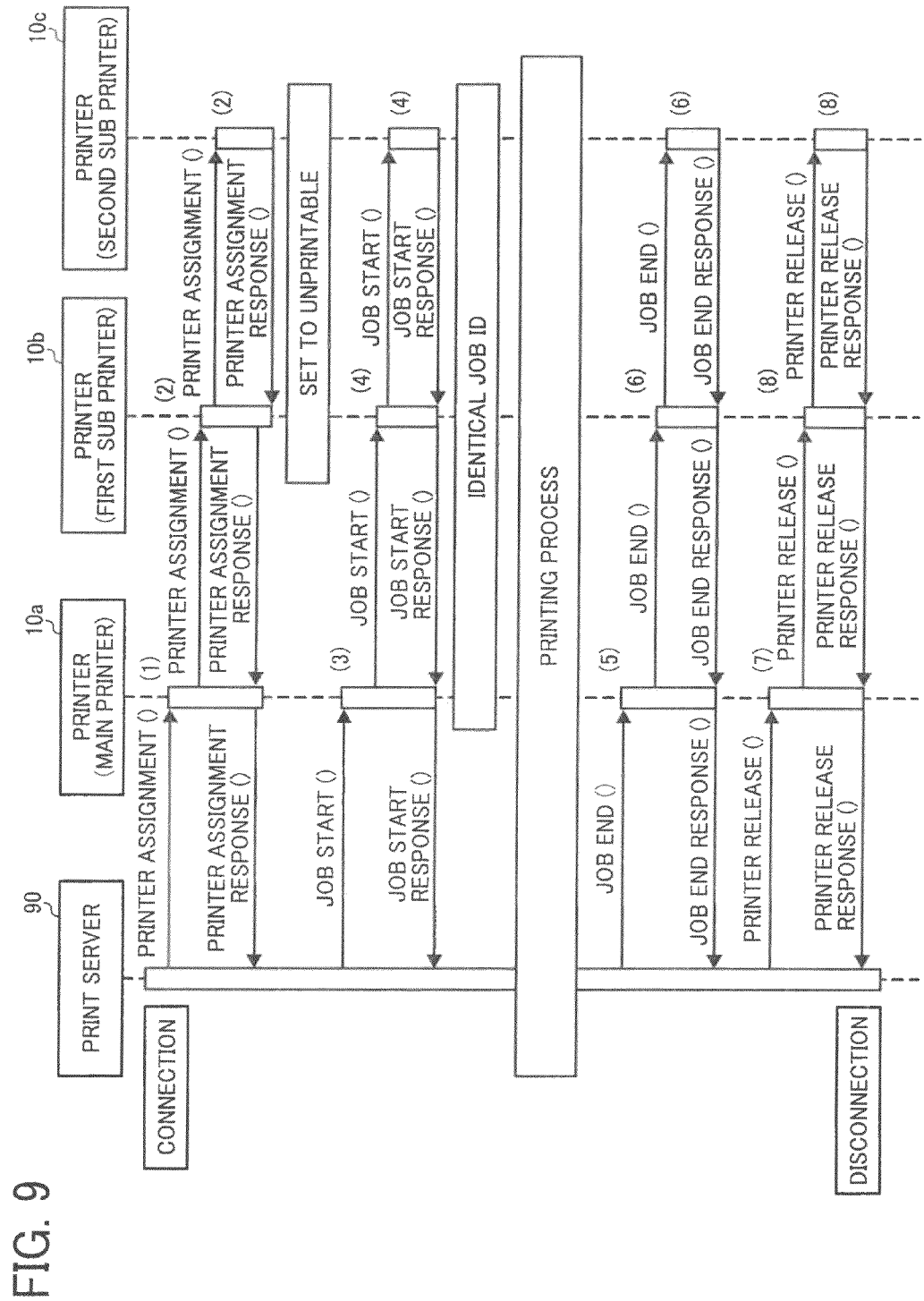
FIG. 9 is a sequence diagram of a printer assigning process.

FIG. 9 is a sequence diagram of a printer assigning process. In the example shown in FIG. 9, a printer that has the necessary functions specified by the print job is selected from the printers on the network in response to a printer assignment request that is output from the print server 90. The printer assignment is performed as follows.

The intranet B to which the printers 10a to 10c are connected is assumed in the example shown in FIG. 9. The printer 10a is set as the main printer, the printer 10b is set as a first sub printer, and the printer 10c is set as a second sub printer.

It is noted that the main printer is set uniquely by the print server 90. The first and the second sub printers can be fixed or changeable depending on the process. If, for example, the IP address of the direct receiver printer is stored in a storage unit and the printer checks the IP address before data transfer, which printer corresponds to "the first sub printer" or "the second printer" is recognizable.

The printer assigning process is performed at the beginning of the network printing process.

Firstly, upon receiving a "printer assignment" command from the print server 90, the main printer sends the "printer assignment" command to the sub printer (the first sub printer of FIG. 9), thereby occupying the printer. This process is performed using the request receiving unit and the request sending unit. At this time, the main printer set sheet-discharge inhibit to information. This information sets the printer to unprintable.

Secondly, the sub printer (the first sub printer of FIG. 9) performs the printer occupation process. Because of presence of the sheet-discharge inhibit, the sub printer sets the printer to unprintable. If a lower-level sub printer (printer downstream with respect to the data flow) is present (in this example, the second sub printer of FIG. 9 is present), the sub printer (the first sub printer of FIG. 9) sends the "printer assignment" command that has been received from the higher-level printer (printer upstream with respect to the data flow) to the lower-level sub printer. If no lower-level printer is present, the sub printer sends a "printer assignment response" command to the higher-level printer. The lower-level printer sends the "printer assignment response" command to the higher-level printer. The printer assignment response contains the IP address of the printer. The printer merges the response information received from the lower-level printer (the IP address of the printer) with the information about itself in sequence and sends the merge data to the higher-level printer. In this manner, the functions of a response-information receiving unit and an information merging unit are used. The main printer waits for the response from the sub printer and sends the "printer assignment response" command to the print server 90.

As a result, the print server 90 receives the merge data that contains information about all the printers.

Because information is transferred from the printers to the print server 90 via the Internet and the firewall, it is necessary to set a predetermined rule to permit the data transfer or transfer the information attached with a mail or the like. Information is transferred from the printers to a print server 90 in the same manner.

The print server 90 manages the merge data that contains information about each of the sub printers and the main printer as a log.

As described above, each printer merges information about the lower-level printer with information about itself and sends the merge data to the higher-level printer as the response and thus merge data is finally sent to the print server 90. Therefore, the print server 90 can obtain information about every printer. If, for example, merge data that contains the status of each printer concerning the printing process (e.g., the destination and the number of printed pages) is sent to the higher-level printer (or the print server) as the response, the sender (the print server) can obtain a result of the printing process performed by each printer.

Thirdly, upon receiving a "JOB start" command from the print server 90, the main printer sends the "JOB start" command to the sub printer (the first sub printer of FIG. 9), thereby performing a job starting process. The main printer adds the acquired job ID to information.

Fourthly, the sub printer (the first sub printer of FIG. 9) performs the job starting process without creating a new job ID. During the job starting process, the job is managed amongst the printers using the job ID that has been received from the main printer. If a lower-level sub printer is present (in this example, the second sub printer of FIG. 9 is present), the sub printer sends the "JOB start" command that has been received from the higher-level printer to the lower-level sub printer. If no lower-level printer is present, the sub printer sends a "JOB start response" command to the higher-level printer. The lower-level printer sends the "JOB start response" command to the higher-level printer. The main printer waits for the response from the sub printer and sends the "JOB start response" command to the print server 90.

When the printer assigning process of the network printing process is completed, the printing process starts.

Figure 10:
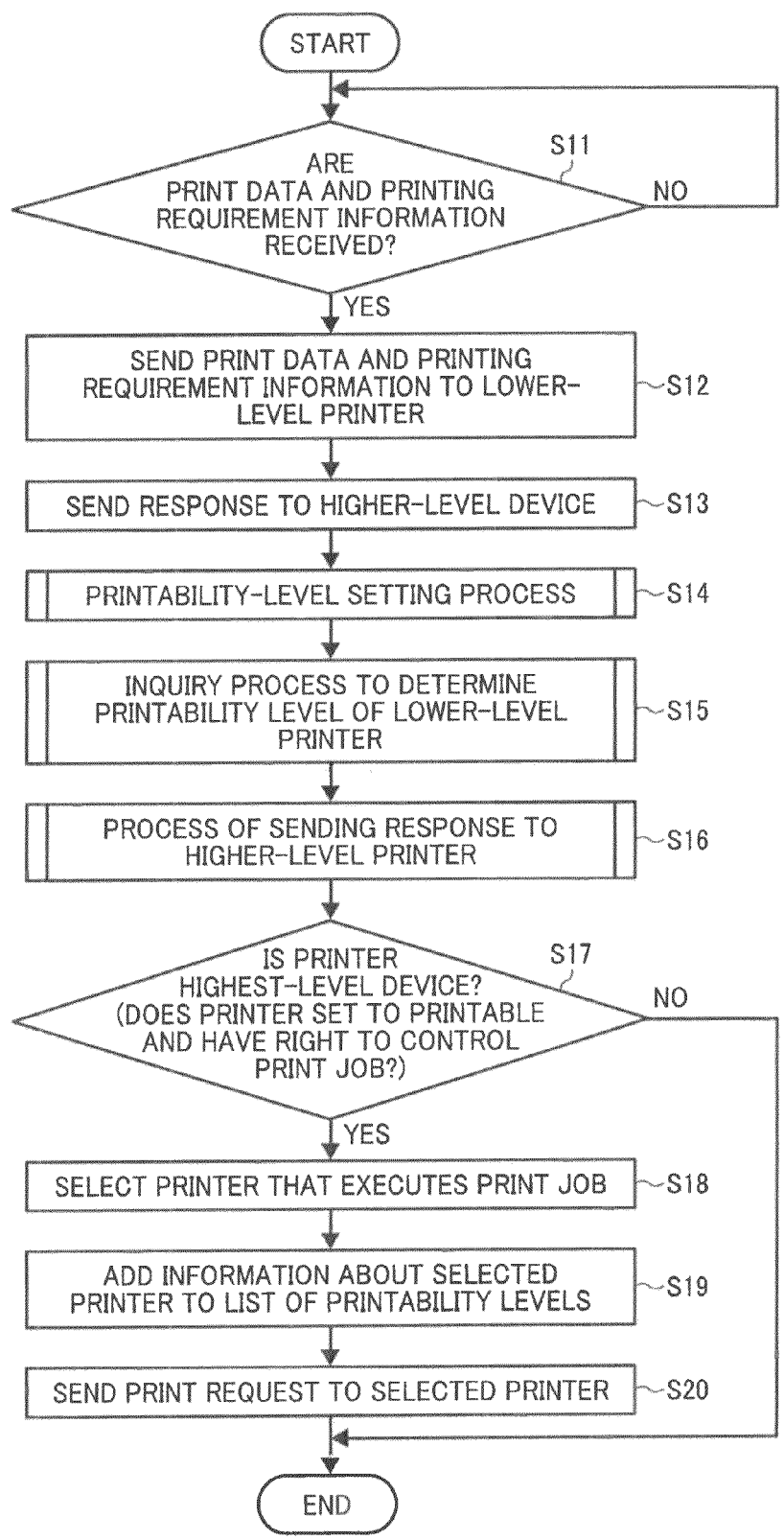
FIG. 10 is a flowchart of a process for outputting a print request when one printer receives a print job.

FIG. 10 is a flowchart of a process for outputting a print request when one printer receives a print job. FIG. 10 is a detailed flowchart of a part of the printing process shown in FIG. 9. At Step S11, the communication unit 290 determines whether print data and information containing the printing requirements, both contained in the print job, are received. If the print data and the information containing the printing requirements are received, the process control goes to Step S12. If no print data and information containing the printing requirements are received, the process control repeats the process at Step S11.

The process control goes from Step S11 to Step S12 and the print data and the information containing the printing requirements that have been received at Step S11 are output to the lower-level printer. The process control goes from Step S12 to Step S13 and a response indicating that the print data is received is output to the higher-level printer.

The process control goes from Steps S12 and S13 to Step S14 and the setting unit 230 sets the printability level. The process control goes from Step S14 to Step S15 and the setting unit 230 inquires the lower-level printer of the printability level. The process control goes from Step S15 to Step S16 and the setting unit 230 combines (merges) information containing the printability level of the self printer set at Step S14 and information containing the printability level of the lower-level printer that has been received at Step S15 as a response to the inquiry and sends the printability levels to the higher-level printer as a response.

The process control goes from Step S16 to Step S17 and it is determined whether the printer is the highest-level printer, i.e., the main printer. The main printer is set to printable, that is, the main printer has a right to control the print job. If the printer is the main printer, the process control goes to Step S18. If the printer is not the main printer, the process control goes to end. Whether the printer is the main printer is determined by comparing the IP address of itself with the IP address of the main printer that is stored as the online printer information.

The series of processes from Step S18 to Step S20 subsequent to Step S17 is performed by the main printer. At Step S18 that is subsequent to Step S17, the networking unit 220 selects the printer that executes the print job. The networking unit 220 selects the printer that executes the print job on the basis of the printability level received at Step S16. The process control goes from Step S18 to Step S19 and the networking unit 220 adds information about the printer selected at Step S18 to the printability level information stored in the storage unit 160.

The process control goes from Step S19 to Step S20 and the print-operation control unit 240 outputs a print request to the printer that is selected at Step S18 to execute the print job.

Figure 11:
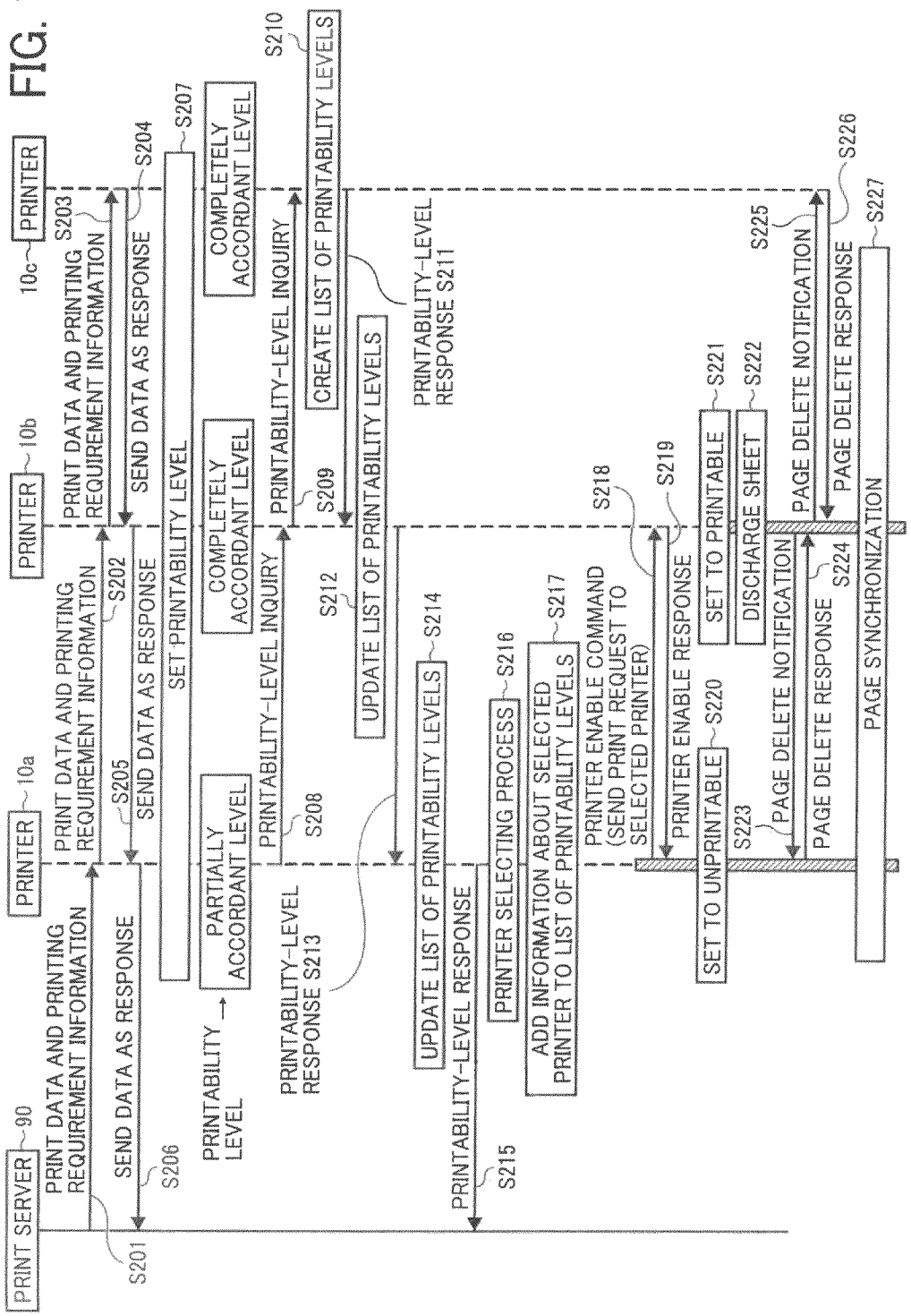
FIG. 11 is a sequence diagram of a process for executing the print job.

FIG. 11 is a sequence diagram of a process for executing the print job. At Step S201 of FIG. 11, the print data and the information containing the printing requirements are sent from the print server 90 to the main printer, i.e., the printer 10a. The information containing the printing requirements includes the MUST requirements and the WANT requirements specified by the print job.

The process control goes from Step S201 to Step S202 and the print data and the information containing the printing requirements are sent from the printer 10a to the printer 10b. The process control goes from Step S202 to Step S203 and the print data and the information containing the printing requirements are sent from the printer 10b to the printer 10c.

The process control goes from Step S203 to Step S204 and a response indicating that the data is received is sent from the printer 10c to the printer 10b. The process control goes from Step S204 to Step S205 and the response received at Step S204 and a response indicating that the printer 10b receives the data are together sent from the printer 10b to the printer 10a.

The process control goes from Step S205 to Step S206 and the response received at Step S205 and a response indicating that the printer 10a receives the data are together sent from the printer 10a to the print server 90.

After the processes from Step S201 to Step S206, the process control goes to Step S207 and the setting unit 230 of each of the printers 10a, 10b, and 10c sets its printability level. In the example shown in FIG. 11, the printability level of the printer 10a is the partially accordant level, which means that the printer 10a has only the functions that satisfy the MUST requirements; the printability level of the printers 10b and 10c is the completely accordant level, which means that each of the printers 10b and 10c has both the functions that satisfy the MUST requirements and the functions that satisfy the WANT requirements.

The process control goes from Step S207 to Step S208 and an inquiry for the printability level that is set at Step S207 is sent from the printer 10a to the printer 10b. The process control goes from Step S208 to Step S209 and an inquiry for the printability level that is set at Step S207 is sent from the printer 10b to the printer 10c.

The process control goes from Step S209 to Step S210 and the setting unit 230 of the printer 10c creates a list of printability levels to be stored in the storage unit 160. The process control goes from Step S210 to Step S211 and the printability level of the printer 10c is sent from the printer 10c to the printer 10b. The process control goes from Step S211 to Step S212 and the setting unit 230 of the printer 10b adds (merges) the printability level of the printer 10b to the list of printability levels received at Step S211, thereby updating the list of printability levels.

The process control goes from Step S212 to Step S213 and the list of printability levels updated at Step S212 is sent from the printer 10b to the printer 10a. The process control goes from Step S213 to Step S214 and the setting unit 230 of the printer 10a adds the printability level of the printer 10a to the printability level received at Step S213, thereby updating the printability level.

The process control goes from Step S214 that is subsequent to Step S215 and the list of printability levels updated at Step S214 is sent from the printer 10a to the print server 90. The list of printability levels that is sent to the print server 90 is stored in the storage unit 160 as the printability level information. The printability level information can be configured to be stored in the storage unit 160 when the printer 10c creates the list of printability levels and updated each time when the printer 10b or 10a updates the list of printability levels.

In this manner, the merge data that contains the printability level information assigned to the lower-level printer and the printability level information assigned to the higher-level printer is sent to a higher-level printer (or the print server 90) as the list of printability levels. Therefore, the higher-level printer and the print server 90 can obtain various pieces of information.

The process control goes from Step S215 to Step S216 and the networking unit 220 of the printer 10a selects the printer that executes the print job. The process control goes from Step S216 to Step S217 and the networking unit 220 adds information about the printer selected at Step S217 to the list of printability levels.

The process control goes from Step S217 to Step S218 and a request is sent from the printer 10a to the printer 10b to set the selected printer to printable. This request is sent to the printer that is selected to execute the print job. The process control goes from Step S218 to Step S219 and a response indicating that the printer 10b is set to printable is sent from the printer 10b to the printer 10a.

The process control goes from Step S219 to Steps S220 and S221. At Step S220, the print-operation control unit 240 sets the printer 10a to unprintable. At Step S221, the print-operation control unit 240 sets the printer 10b to printable. As a result of the processes, the first page of the print job is printed by the printer 10b. The process control goes from Step S221 to Step S222 and the printed first page is discharged from the engine 800.

The process control goes from Step S222 to Step S223 and a page delete notification is sent from the page deleting unit 250 of the printer 10b to the printer 10a. The page deleting unit 250 of the printer 10a performs a page deleting process in accordance with the notification. More particularly, for example, the number of printed pages increases one. The process control goes from Step S223 to Step S224 and a notification indicating that the page deleting process is completed is sent from the printer 10a to the printer 10b.

At Step S225 that is subsequent to or asynchronous to Steps S223 and S224, the page delete notification is sent from the printer 10b to the printer 10c. The page deleting unit 250 of the printer 10c performs the page deleting process in accordance with the notification. The process control goes from Step S225 to Step S226 and a notification indicating that the page deleting process is completed is sent from the printer 10c to the printer 10b.

Not synchronized with the processes from Step S223 to Step S226, the page deleting unit 250 of the printer 10b performs the page deleting process. When the processes from Step S223 to Step S226 are completed, the process control goes to Step S227. The printed page is synchronizes at Step S227.

Figure 12:
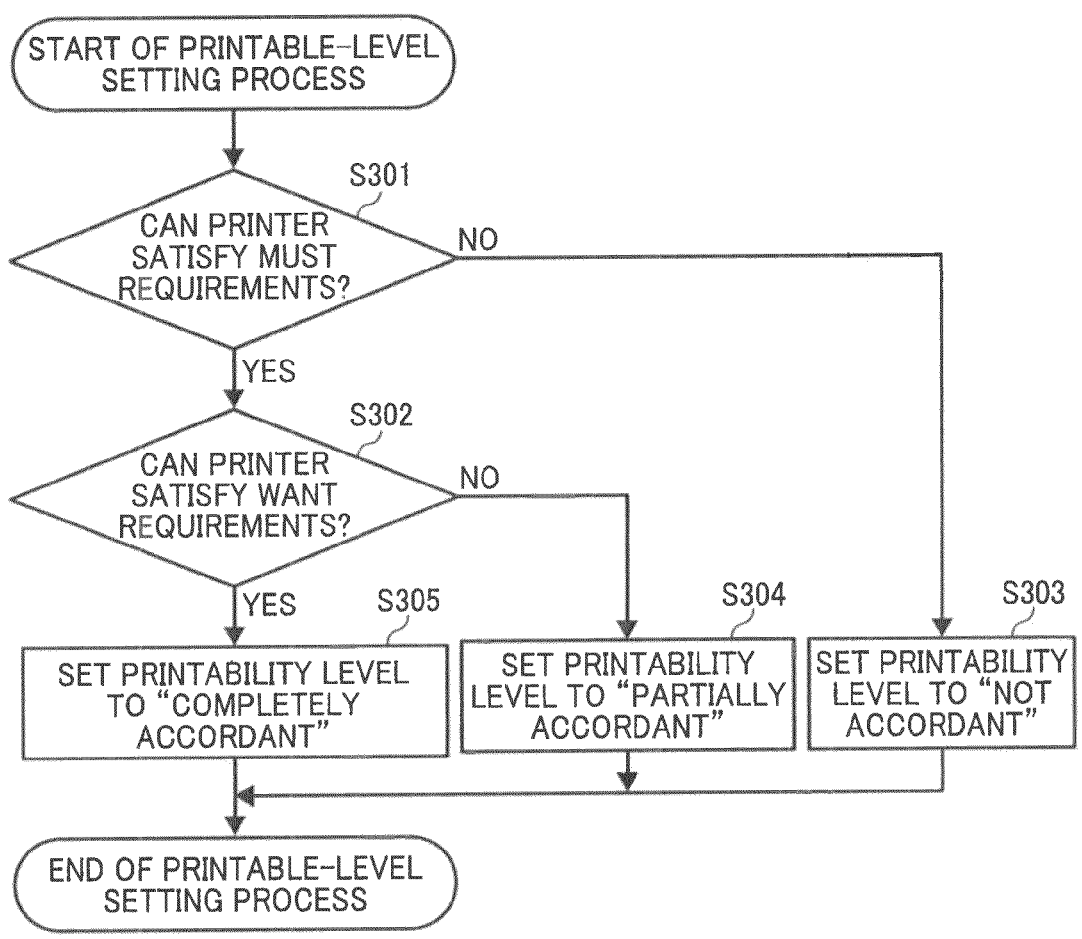
FIG. 12 is a flowchart of a printability-level setting process according to the first embodiment.

FIG. 12 is a flowchart of a printability-level setting process. The process shown in FIG. 12 is performed by the setting unit 230 of each printer at Step S207 of FIG. 11.

At Step S301 of FIG. 12, it is determined whether the printer can satisfy the MUST requirements. The phrase "the printer can satisfy the MUST requirements" means that the printer has the functions that satisfy the MUST requirements. If the printer can satisfy the MUST requirements, the process control goes to Step S302. If the printer cannot satisfy the MUST requirements, the process control goes to Step S303.

At Step S302 that is subsequent to Step S301, it is determined whether the printer can satisfy the WANT requirements. The phrase "the printer can satisfy the WANT requirements" means that the printer has the functions that satisfy the WANT requirements. If the printer can satisfy the WANT requirements, the process control goes to Step S305. If the printer cannot satisfy the WANT requirements, the process control goes to Step S304.

At Step S303, the printability level is set to "not accordant level". At Step S304, the printability level is set to "partially accordant level". At Step S305, the printability level is set to "completely accordant level".

Figure 13:
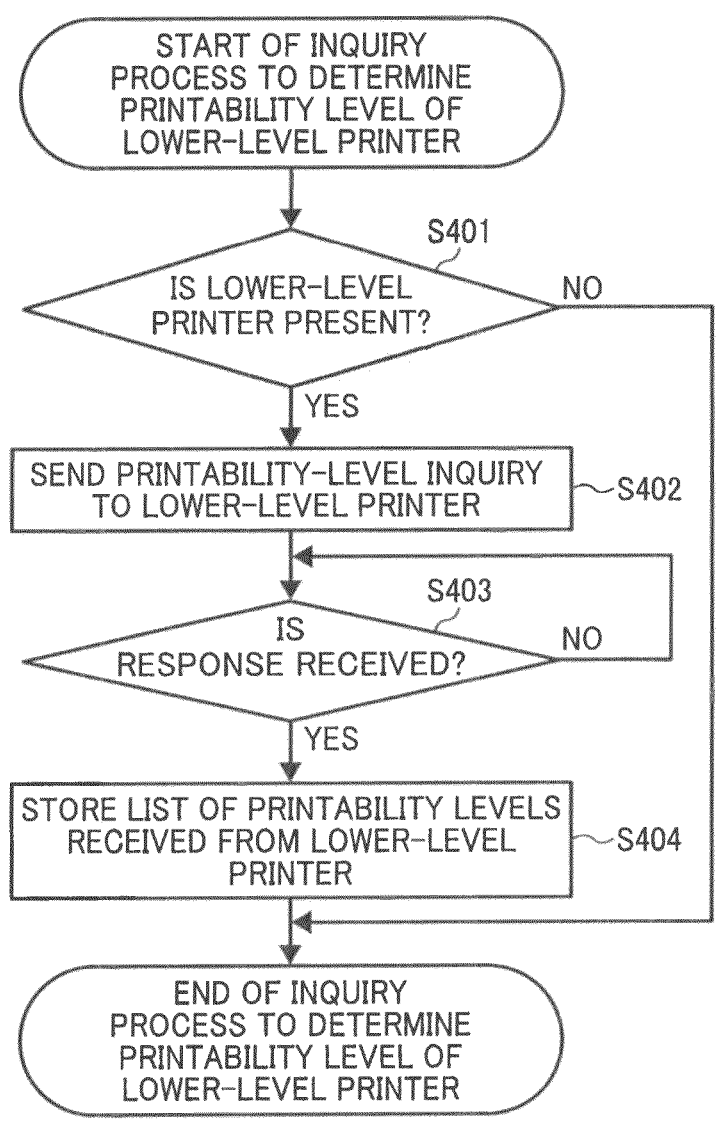
FIG. 13 is a flowchart of an inquiry process to determine a printability level of a lower-level printer.

FIG. 13 is a flowchart of an inquiry process to determine the printability level of the lower-level printer. This process shown in FIG. 13 is performed by the setting unit 230 of each printer. At Step S401 of FIG. 13, it is determined whether a lower-level printer is present. This determination is made by referring to a management information table stored in an external storage device (not shown). If a lower-level printer is present, the process control goes to Step S402. If no lower-level printer is present, the process control goes to end.

The process control goes from Step S401 to Step S402 and a printability level inquiry is sent to the lower-level printer using the IP address of the lower-level printer that is obtained at Step S401. The process control goes from Step S402 to Step S403 and it is checked whether a response is received from the printer to which the inquiry is sent at Step S402. If a response is received, the process control goes to Step S404. If no response is received, the process at Step S403 is repeated.

At Step S404 that is subsequent to Step S403, the list of printability levels is received from the lower-level printer and the received list of printability levels is stored in the storage unit 160 as the printability level information. The printability level of the self printer is added to the printability level information stored in the storage unit 160.

Figures 14, 15:
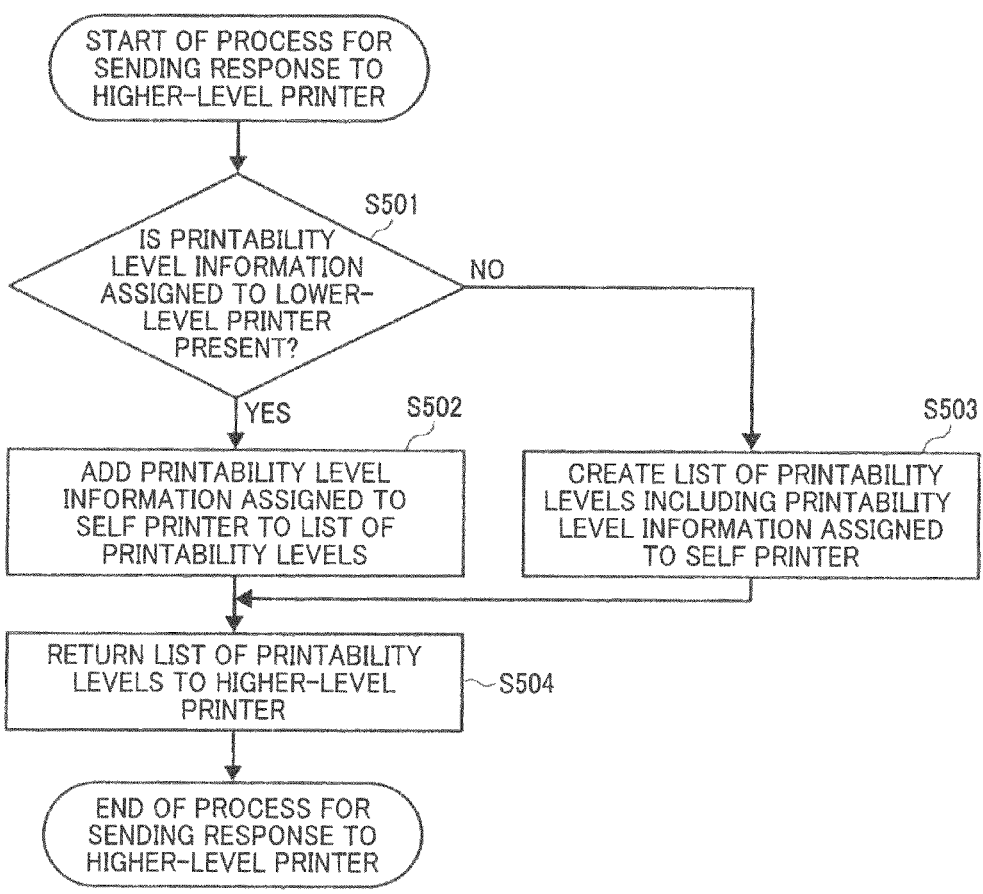
FIG. 14 is a flowchart of a process for sending a list of printability levels in response to a printability level inquiry.
FIG. 15 is an example of the list of printability levels.

FIG. 14 is a flowchart of a process for sending a list of printability levels in response to the printability level inquiry. The process shown in FIG. 14 is performed by the setting unit 230 of each printer.

At Step S501 of FIG. 14, it is determined whether the printability level information assigned to the lower-level printer is present. If the determination is positive, the process control goes to Step S502. If the determination is negative, the process control goes to Step S503.

At Step S502 that is subsequent to Step S501, the printability level of the self printer is added to the list of printability levels. At Step S503, a new list of printability levels that contains the printability level information assigned to the self printer is created.

At Step S504 that is subsequent to Step S502 or Step S503, the list of printability levels is sent to the higher-level printer.

FIG. 15 is an example of the list of printability levels. In the example shown in FIG. 15, fields of the printability level and the selected printer information are associated with each of three printers that include the main printer (Main) and printer 1 and 2 that work as the sub printers. The printability level of the main printer is "partially accordant level" and the printability level of each of the printers 1 and 2 is "completely accordant level".

The selected printer information is information indicative of a printer that executes the print job. In the example shown in FIG. 15, the printer 1 is set as the printer that executes the print job.

In the present embodiment, during recovery printing, the printer that executes the print job is selected by placing an emphasis on the MUST requirements. Therefore, the recovery printing is performed using a printer that is selected on the basis of the MUST requirements in accordance with the function's degree of user-specified importance.

If it is determined that a specified printer cannot execute the print job because the specified printer does not satisfy the specified requirements received from the print server, another printer that does satisfy the specified requirements received from the print server executes the print job as an alternative printer; therefore, the print job is reliably executed, which improves the printing reliability.

Second Embodiment

In the first embodiment, during the recovery printing, the printer that executes the print job is selected by placing an emphasis on the MUST requirements. In the second embodiment, in contrast, if the printers have only some of the functions that satisfy the MUST requirements, the printer that executes the print job is selected as an alternative printer from the perspective of the WANT requirements and the alternative printer executes the print job.

FIG. 16 is a block diagram of the functional configuration of a print control unit 1600 according to the second embodiment. The general configuration of a printer according to the present embodiment is the same as that of the printer according to the first embodiment. As shown in FIG. 16, the print control unit 1600 according to the present embodiment includes the status managing unit 210, a networking unit 1620, a setting unit 1630, the print-operation control unit 240, the page deleting unit 250, and the communication unit 290. The function and the configuration of each of the status managing unit 210, the print-operation control unit 240, the page deleting unit 250, and the communication unit 290 are the same as the function and the configuration of the corresponding unit in the first embodiment. The online printer information, the page information, the function information, and the printing requirement information are the same as the corresponding information used in the first embodiment.

The printability level used in the present embodiment is different from the printability level used in the first embodiment. FIG. 17 is a schematic diagram of the structure of the printability level information according to the second embodiment. The printability level information used in the second embodiment contains a list of necessary functions that satisfy each requirement and the printability level for the MUST requirements and the printability level for WANT requirements any of "completely accordant", "partially accordant" and "not accordant".

If the completely accordant level is assigned to the set of MUST requirements, the printer has all the functions that satisfy the MUST requirements. If the partially accordant level is assigned to the set of MUST requirements, the printer has some of the functions that satisfy the MUST requirements. If the not accordant level is assigned to the set of MUST requirements, the printer has no functions that satisfy the MUST requirements.

If the completely accordant level is assigned to the set of WANT requirements, the printer has all the functions that satisfy the WANT requirements. If the partially accordant level is assigned to the set of WANT requirements, the printer has some of the functions that satisfy the WANT requirements. If the not accordant level is assigned to the set of WANT requirements, the printer has no functions that satisfy the WANT requirements.

Referring back to FIG. 16, the setting unit 1630 compares the function information assigned to the printer 10b with each of the functions that satisfy the MUST requirements and the functions that satisfy the WANT requirements both extracted from the printing requirement information and sets the printability level for the MUST requirements and the printability level for the WANT requirements, independently in the above-described manner, thereby creating the printability level information. The setting unit 1630 registers the created printability level information to the list of printability levels in the same manner as in the first embodiment.

If the printer is the main printer, the networking unit 1620 selects, by checking the list of printability levels, the printer that executes the print job on the basis of the printability level for the MUST requirements and the printability level for the WANT requirements of each printer. More particularly, if no printer is present other than printers that have some or none of the functions that satisfy the MUST requirements, then the networking unit 1620 places an emphasis on the WANT requirements and selects, as the printer that executes the print job, the highest-level printer out of printers that have all the functions that satisfy the WANT requirements. If no printer is present that has all the functions that satisfy the WANT requirements, the networking unit 1620 selects, as the printer that executes the print job, the highest-level printer out of printers that have some of the functions that satisfy the WANT requirements. The functions of the networking unit 1620 other than the printer selecting function are the same as those described in the first embodiment.

Figure 18:
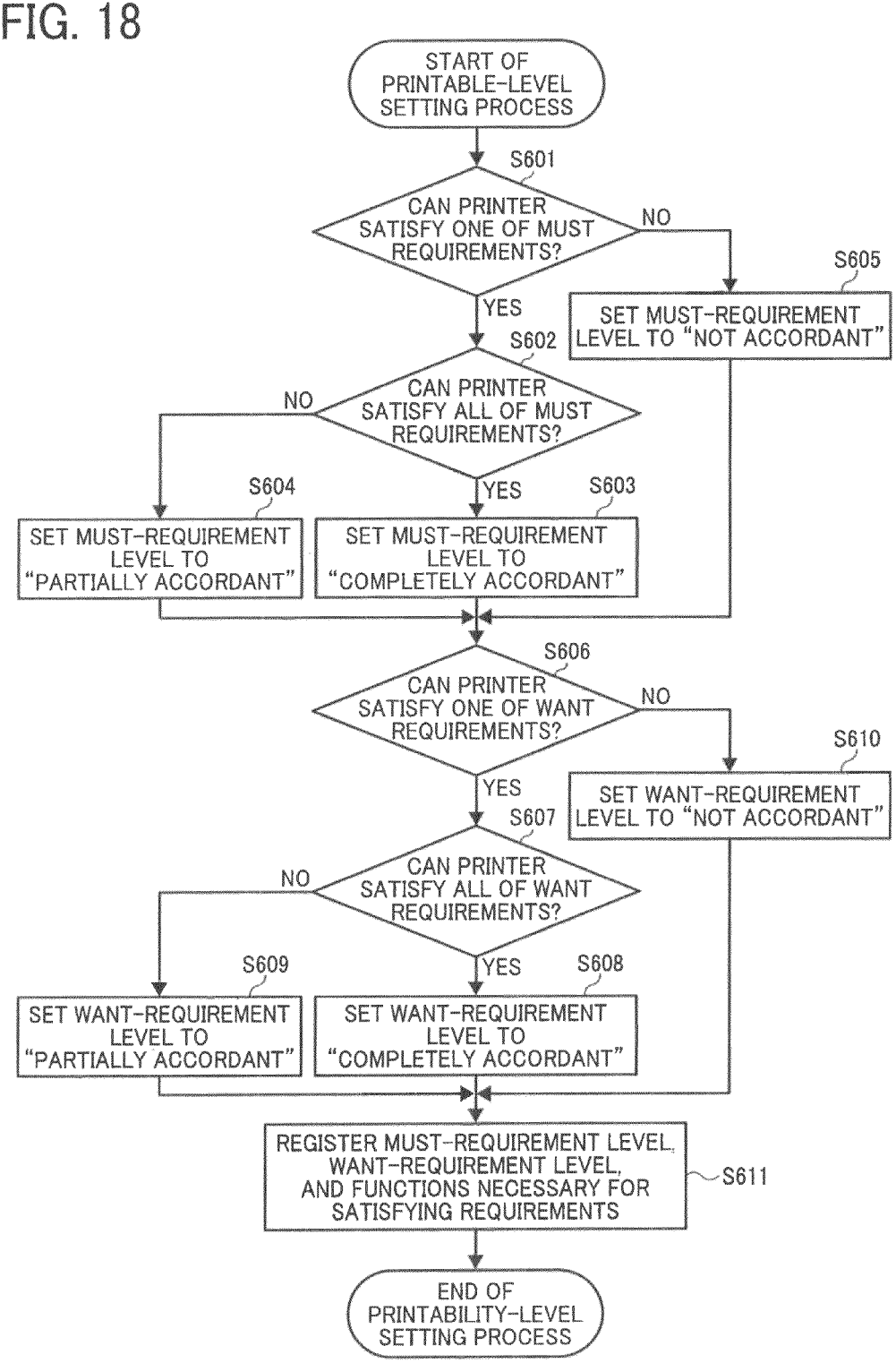
FIG. 18 is a flowchart of a printability-level setting process according to the second embodiment.

A printability-level setting process performed by the printer according to the present embodiment is described below. FIG. 18 is a flowchart of the printability-level setting process according to the second embodiment. In the following, the printability level for the MUST requirements is called "MUST-requirement level" and the printability level for the WANT requirements is called "WANT-requirement level".

The setting unit 1630 determines whether the printer can satisfy one of the MUST requirements by referring to the function information (Step S601). If the printer cannot satisfy any of the MUST requirements (No at Step S601), the setting unit 1630 sets the MUST-requirement level "not accordant" (Step S605).

If the printer can satisfy one of the MUST requirements (Yes at Step S601), the setting unit 1630 determines whether the printer can satisfy all the MUST requirements (Step S602). If the printer can satisfy all the MUST requirements (Yes at Step S602), the setting unit 1630 sets the MUST-requirement level "completely accordant" (Step S603). If the printer can satisfy only some of the MUST requirements (No at Step S602), the setting unit 1630 sets the MUST-requirement level "partially accordant" (Step S604).

After that, the setting unit 1630 determines whether the printer can satisfy one of the WANT requirements by referring to the function information (Step S606). If the printer cannot satisfy any of the WANT requirements (No at Step S606), the setting unit 1630 sets the WANT-requirement level "not accordant" (Step S610)

If the printer can satisfy one of the WANT requirements (Yes at Step S606), the setting unit 1630 determines whether the printer can satisfy all the WANT requirements (Step S607). If the printer can satisfy all the WANT requirements (Yes at Step S607), the setting unit 1630 sets the WANT-requirement level "completely accordant" (Step S608). If the printer can satisfy only some of the WANT requirements (No at Step S607), the setting unit 1630 sets the WANT-requirement level "partially accordant" (Step S609).

The setting unit 1630 registers the MUST-requirement level, the WANT-requirement level, and the functions that satisfy each requirement to the printability level information (Step S611).

Figure 19:
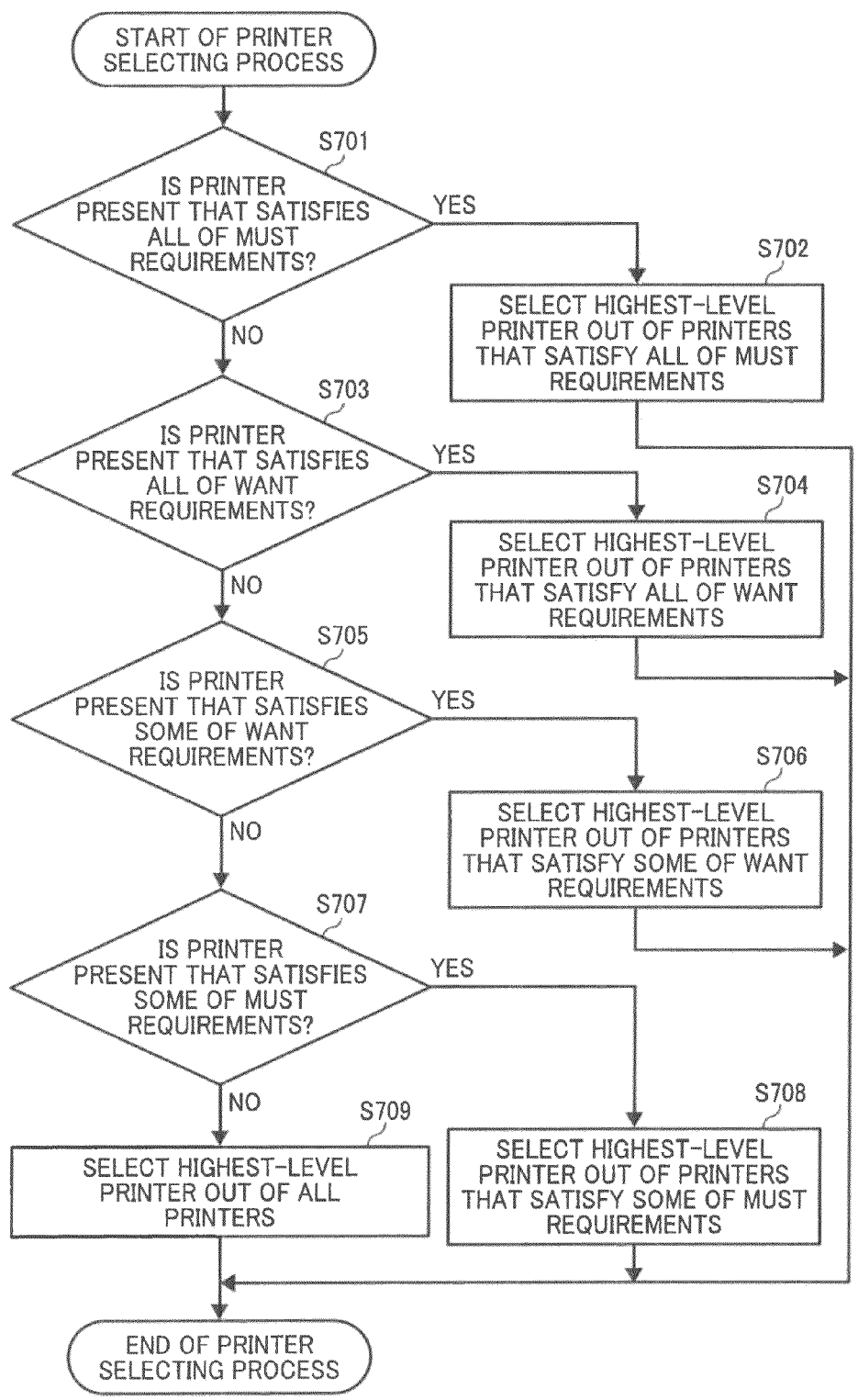
FIG. 19 is a flowchart of a printer selecting process according to the second embodiment.

A printer selecting process performed by the main printer according to the second embodiment is described below. FIG. 19 is a flowchart of the printer selecting process according to the second embodiment.

The networking unit 1620 checks whether a printer is present that satisfies all of the MUST requirements by referring to the list of printability levels (Step S701). If a printer is present that satisfies all of the MUST requirements (Yes at Step S701), the networking unit 1620 selects, as the printer that executes the print job, the highest-level printer out of printers that satisfy all of the MUST requirements (Step S702).

If no printer is present that satisfies all of the MUST requirements (No at Step S701), i.e., no printer is present other than printers that satisfy some or none of the MUST requirements, the networking unit 1620 checks whether a printer is present that satisfies all of the WANT requirements by referring to the list of printability levels (Step S703). If a printer is present that satisfies all of the WANT requirements (Yes at Step S703), the networking unit 1620 selects, as the printer that executes the print job, the highest-level printer out of printers that satisfy all of the WANT requirements (Step S704).

If no printer is present that satisfies all of the WANT requirements (No at Step S703), the networking unit 1620 checks whether a printer is present that satisfies some of the WANT requirements by referring to the list of printability levels (Step S705). If a printer is present that satisfies some of the WANT requirements (Yes at Step S705), the networking unit 1620 selects, as the printer that executes the print job, the highest-level printer out of printers that satisfy some of the WANT requirements (Step S706).

If no printer is present that satisfies some of the WANT requirements (No at Step S705), the networking unit 1620 checks whether a printer is present that satisfies some of the MUST requirements by referring to the list of printability levels (Step S707). If a printer is present that satisfies some of the MUST requirements (Yes at Step S707), the networking unit 1620 selects, as the printer that executes the print job, the highest-level printer out of printers that satisfy some of the MUST requirements (Step S708).

If no printer is present that satisfies some of the MUST requirements (No at Step S707), the networking unit 1620 selects, as the printer that executes the print job, the highest-level printer out of all the printers (Step S709). Alternatively, in this case, it can be configured to output an error message that it is impossible to execute the print job, because none of the printers satisfy any of the MUST requirements and any of the WANT requirements.

The processes other than the printability-level setting process and the printer selecting process are performed in the same manner as in the first embodiment.

Figure 20:
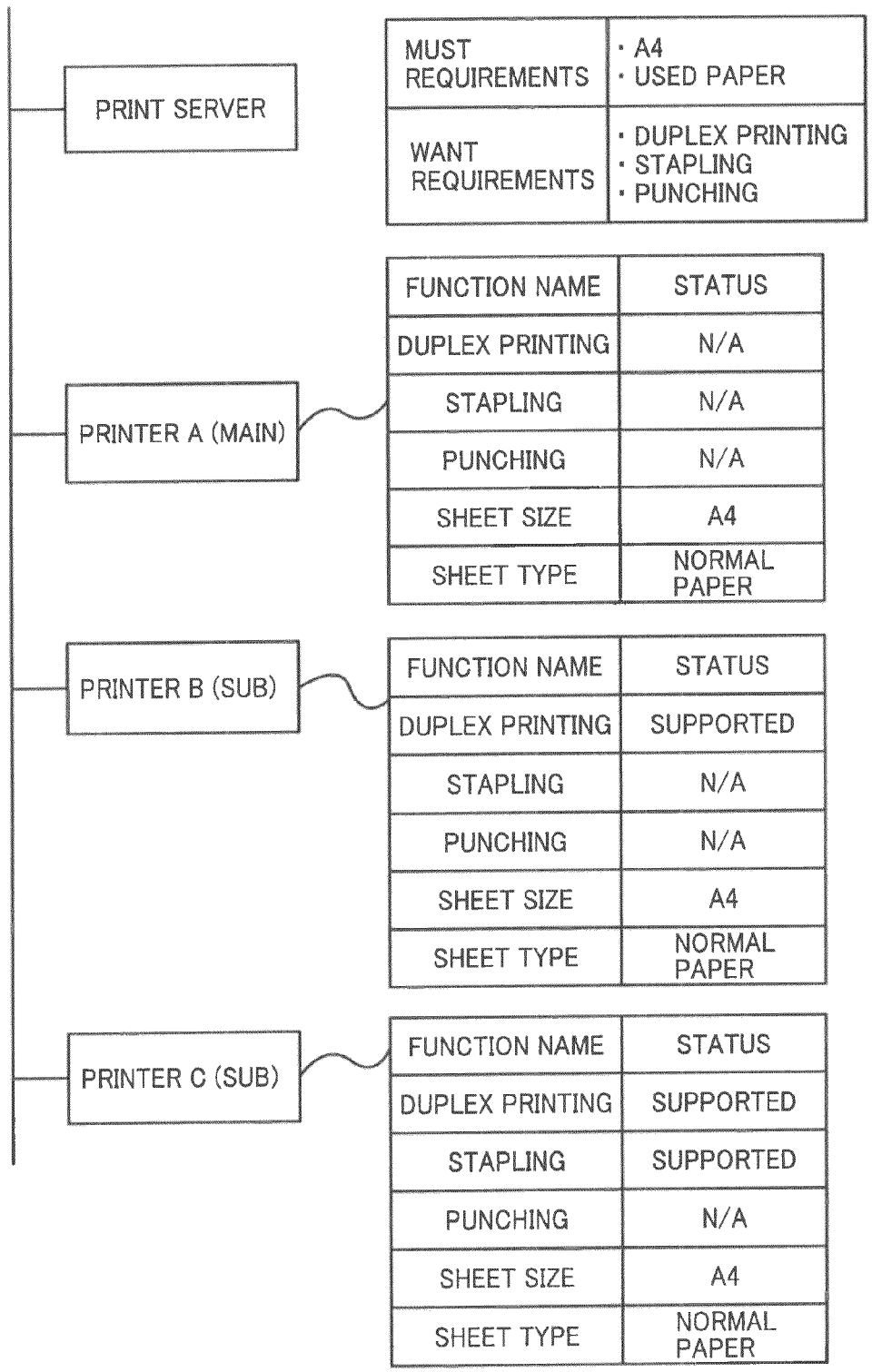
FIG. 20 is a schematic diagram of a print control system according to the present embodiment.

FIG. 20 is a schematic diagram of a print control system according to the present embodiment. In the example shown in FIG. 20, printing requirements include the MUST requirements "A4 sheet" and "used paper" and the WANT requirements "duplex printing", "stapling", and "punching". A printer A is the main printer, and printers B and C are the sub printers. The function information assigned to each of the printers A, B, and C is displayed near the block of the corresponding printer.

In the example shown in FIG. 20, no printer is present that satisfies all of the MUST requirements. The WANT-requirement level of the printer A is "not accordant"; the WANT-requirement level of the printer B is "partially accordant"; and the WANT-requirement level of the printer C is "partially accordant". Therefore, in the example shown in FIG. 20, the networking unit 1620 of the printer A selects the printer B as the printer that executes the print job, because the printer B is the highest-level printer out of the printers B and C having the WANT-requirement level "partially accordant".

Although, in the present embodiment, if a printer is present that satisfies all of the WANT requirements, the highest-level printer is selected out of printers that satisfy all of the WANT requirements and only if no printer is present that satisfies all of the WANT requirements, the highest-level printer is selected out of printers that satisfy some of the WANT requirements, the configuration is not limited thereto. For example, the networking unit 1620 can be configured to select, as the printer that executes the print job, the highest-level printer out of printers that satisfy all or some of the WANT requirements.

As described above, in the present embodiment, if the printers have some of the functions that satisfy the MUST requirements, the WANT requirements are checked and the highest-level printer is selected from the printers that satisfy all or some of the WANT requirements. This selected printer then executes the print job as an alternative printer. Therefore, when compared with the first embodiment, which places an emphasis on the MUST requirements, the recovery printing performed in the present embodiment uses a printer that is selected more in accordance with the function's degree of user-specified importance.

Third Embodiment

In the second embodiment, if the printers have only some of the functions that satisfy the MUST requirements, the highest-level printer is selected out of the printers that satisfy all or some of the WANT requirements as the printer that executes the print job. In the third embodiment, in contrast, a printer that has the largest number of functions that satisfy the WANT requirements is selected out of printers that satisfy all or some of the WANT requirements as the printer that executes the print job during the recovery printing, regardless whether the selected printer is a high-level printer or a low-level printer.

Figure 21:
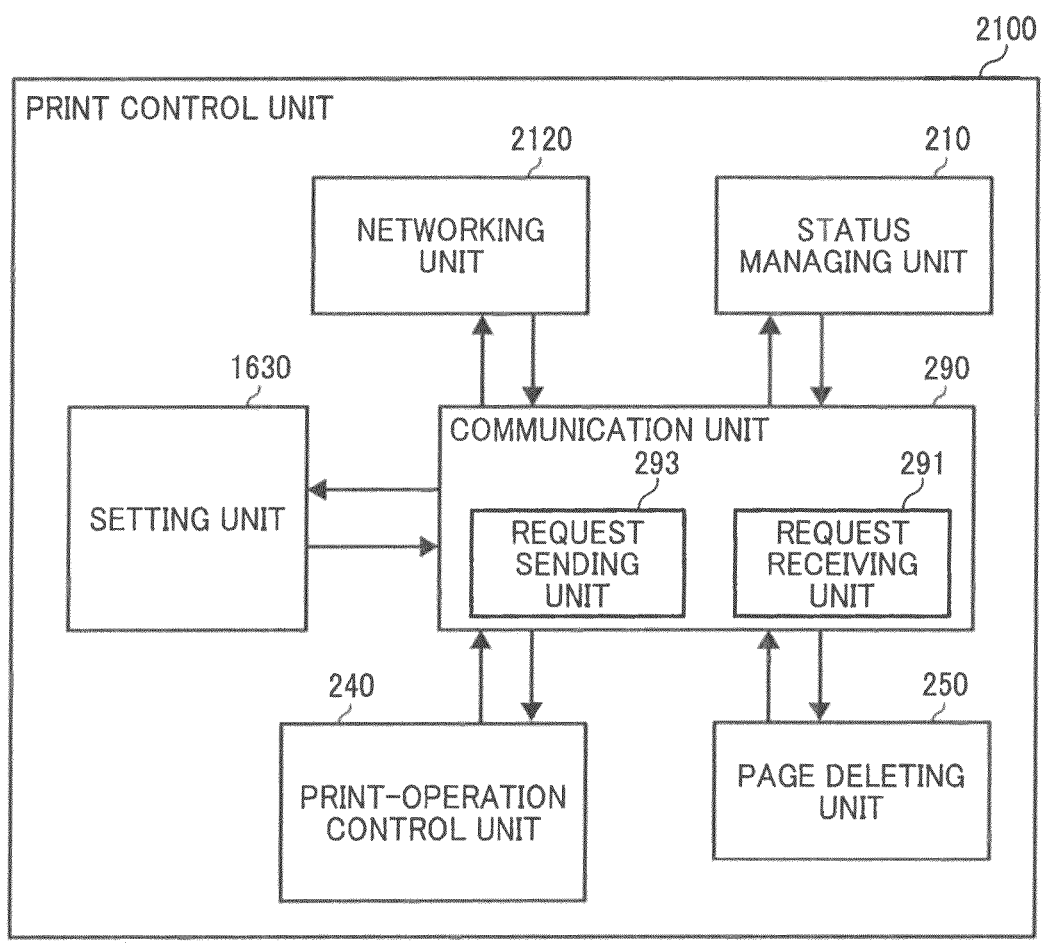
FIG. 21 is a block diagram of the functional configuration of a print control unit according to the third embodiment.

FIG. 21 is a block diagram of the functional configuration of a print control unit 2100 according to the third embodiment. The general configuration of a printer according to the present embodiment is the same as those of the printers according to the first and the second embodiments. As shown in FIG. 21, the print control unit 2100 according to the present embodiment includes the status managing unit 210, a networking unit 2120, the setting unit 1630, the print-operation control unit 240, the page deleting unit 250, and the communication unit 290. The function and the configuration of each of the status managing unit 210, the print-operation control unit 240, the page deleting unit 250, and the communication unit 290 are the same as the function and the configuration of the corresponding unit in the first and the second embodiments. The function of the setting unit 1630 is the same as that in the second embodiment. The online printer information, the page information, the function information, the printing requirement information, and the printability level information are the same as the corresponding information used in the second embodiment.

Figure 22:
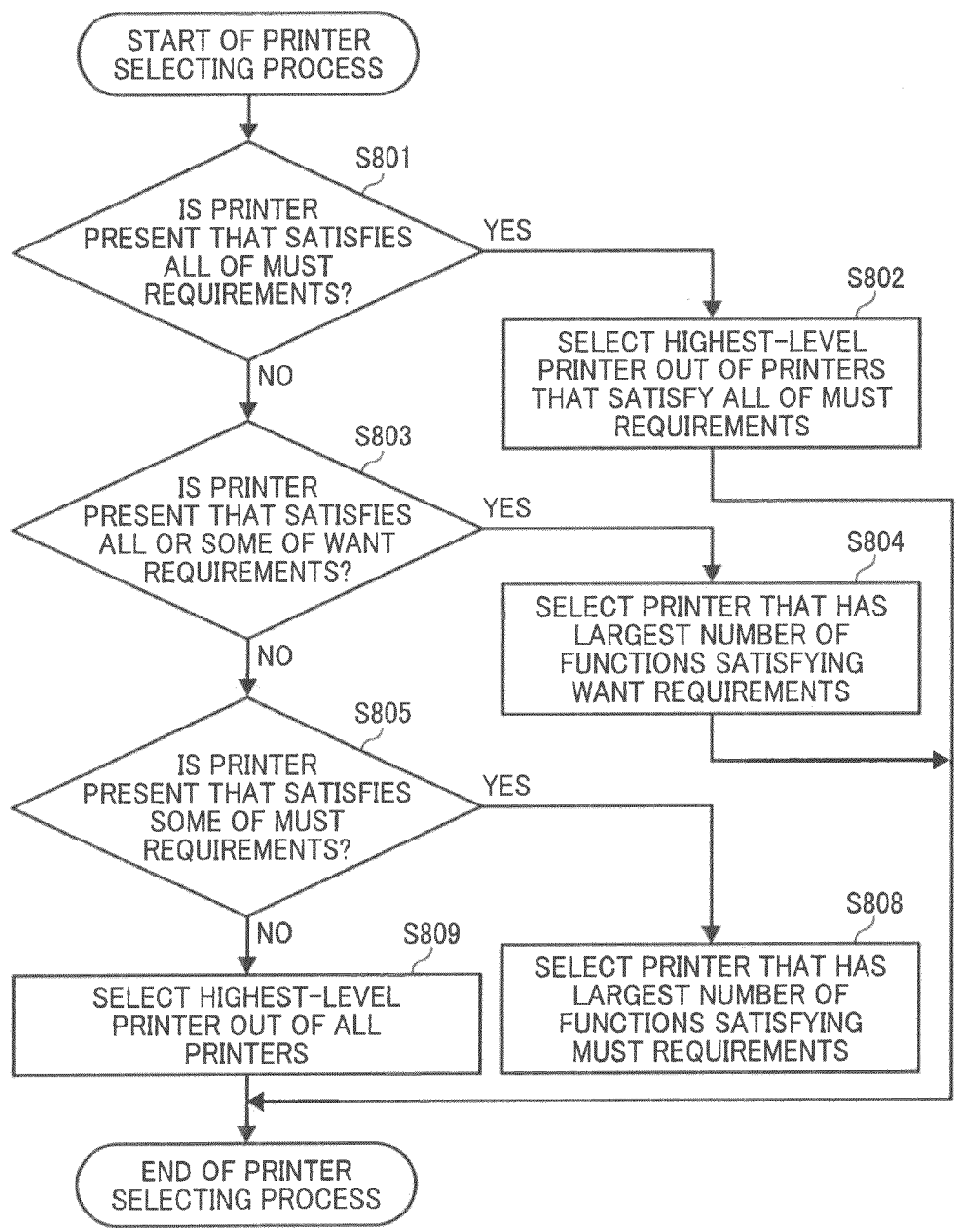
FIG. 22 is a flowchart of a printer selecting process according to the third embodiment.

The networking unit 2120 selects the printer that executes the print job using the MUST-requirement levels and the WANT-requirement levels of the printers by referring to the list of printability levels, thereby performing the printer selecting process. If no printer is present other than printers that satisfy some or none of the MUST requirements, the networking unit 2120 according to the present embodiment places an emphasis on the number of functions that satisfy the WANT requirements and selects, as the printer that executes the print job, a printer that has the largest number of functions that satisfy the WANT requirements out of printers that satisfy all or some of the WANT requirements, regardless whether the selected printer is a high-level printer or a low-level printer. The functions of the networking unit 2120 other than the printer selecting function are the same as the network units according to the first and the second embodiments. The printer selecting process performed by the printer according to the present embodiment is described below. FIG. 22 is a flowchart of the printer selecting process according to the third embodiment.

The networking unit 2120 checks whether a printer is present that satisfies all of the MUST requirements by referring to the list of printability levels (Step S801). If a printer is present that satisfies all of the MUST requirements (Yes at Step S801), the networking unit 2120 selects, as the printer that executes the print job in the same manner as the networking unit 1620 according to the second embodiment selects, the highest-level printer out of printers that satisfy all of the MUST requirements (Step S802).

If no printer is present that satisfies all of the MUST requirements (No at Step S801), i.e., no printer is present other than printers that satisfy some or none of the MUST requirements, the networking unit 2120 checks whether a printer is present that satisfies all or some of the WANT requirements by referring to the list of printability levels (Step S803). If a printer is present that satisfies all or some of the WANT requirements (Yes at Step S803), the networking unit 2120 selects, as the printer that executes the print job, a printer that has the largest number of the functions that satisfy the WANT requirements by referring to a list of functions that satisfy the WANT requirements (Step S804). The printer is selected regardless whether the selected printer is a high-level printer or a low-level printer.

If no printer is present that satisfies all or some of the WANT requirements (No at Step S803), the networking unit 2120 checks whether a printer is present that satisfies some of the MUST requirements by referring to the list of printability levels (Step S805). If a printer is present that satisfies some of the MUST requirements (Yes at Step S805), the networking unit 2120 selects, as the printer that executes the print job, a printer that has the largest number of the functions that satisfy the MUST requirements by referring to a list of functions that satisfy the MUST requirements (Step S808). The printer is selected regardless whether the selected printer is a high-level printer or a low-level printer.

If no printer is present that satisfies some of the MUST requirements (No at Step S805), the networking unit 2120 selects, as the printer that executes the print job, the highest-level printer out of all the printers (Step S809). Alternatively, in this case, it can be configured to output an error message that it is impossible to execute the print job.

In the example shown in FIG. 20, no printer is present that satisfies all of the MUST requirements. The WANT-requirement level of the printer A is "not accordant" and the number of necessary functions is zero; the WANT-requirement level of the printer B is "partially accordant" and the printer B has one necessary function "duplex printing"; and the WANT-requirement level of the printer C is "partially accordant" and the printer C has two necessary functions "duplex printing" and "stapling". Therefore, in the example shown in FIG. 20, the networking unit 2120 of the printer A selects the printer C as the printer that executes the print job, because the WANT-requirement levels of the printers B and C are "partially accordant" and the printer C has the necessary functions more than the printers B has. It is noted that the printer B is higher than the printer C; nevertheless, the printer C is selected.

The processes other than the printer selecting process are performed in the same manner as in the first and the second embodiments.

Although, in the present embodiment, only if no printer is present that satisfies all of the MUST requirements, the printer that has the largest number of functions that satisfy the WANT requirements is selected, the configuration is not limited thereto. For example, the networking unit 2120 can be configured to select, regardless of presence of a printer that satisfies all of the MUST requirements, the printer that has the largest number of functions that satisfy the WANT requirements out of printers that satisfy all or some of the WANT requirements.

As described above, in the present embodiment, if printers have some of the functions that satisfy the MUST requirements, the printer that has the largest number of functions that satisfy the WANT requirements is selected from printers that satisfy all or some of the WANT requirements as the printer that executes the print job, regardless whether the selected printer is a high-level printer or a low-level printer. This selected printer then executes the print job as an alternative printer. Therefore, even if a printer that has all of the functions that satisfy the MUST requirements is present, another printer can be selected that has a large number of functions that satisfy the WANT requirements but has some of the functions that satisfy the MUST requirements. As a result, when compared with the first embodiment, which places an emphasis on the MUST requirements, the recovery printing performed in the present embodiment uses a printer that is selected more in accordance with the function's degree of user-specified importance.

Fourth Embodiment

In the second embodiment, the printer is selected in accordance with the relative position among the printers with respect to data flow and therefore the highest-level printer is selected out of printers that satisfy all or some of the WANT requirements. In the third embodiment, the printer is selected in accordance with the number of functions that satisfy the WANT requirements and therefore the printer that has the largest number of functions that satisfy the WANT requirements is selected as the printer that executes the print job. In the fourth embodiment, in contrast, the user can select the selection manner, whether a higher-level printer is to be selected or a printer having a lager number of functions that satisfy the WANT requirements is to be selected. The printer is selected in accordance with the selection manner specified by the user.

Figure 23:
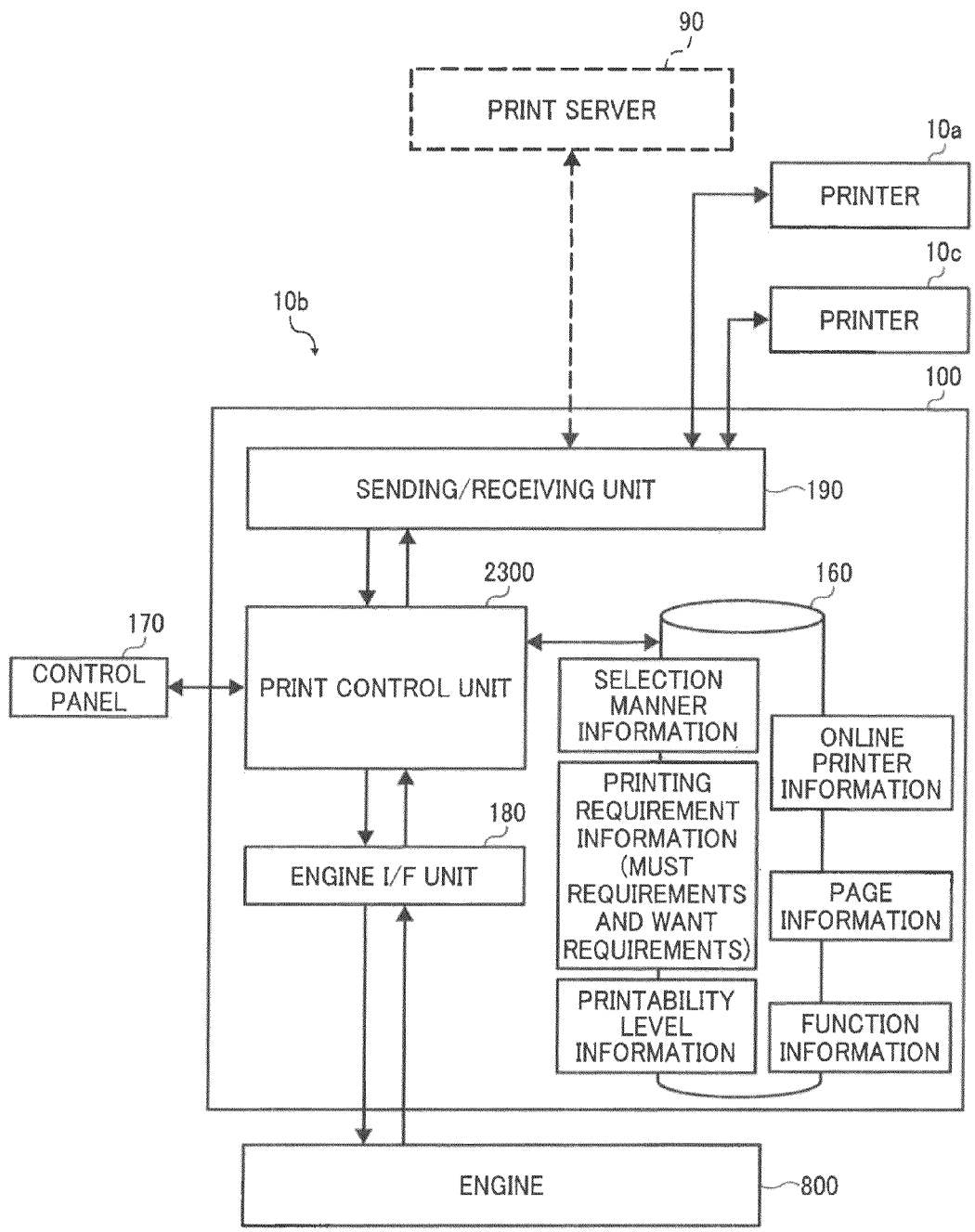
FIG. 23 is a block diagram of the general configuration of a printer according to the fourth embodiment.

FIG. 23 is a block diagram of the general configuration of the printer 10*b* according to the fourth embodiment. In the same manner as in the first to the third embodiments, the printer 10*b* is connected to the print server 90, the printer 10*a*, and the printer 10*c*.

The controller 100 of the printer 10*b* includes the sending/receiving unit 190, a print control unit 2300, the storage unit 160, and the engine I/F unit 180.

The storage unit 160 stores therein information to be processed by the printer 10*b*. The storage unit 160 stores therein selection manner information, the online printer information, the page information, the function information, the information containing the printing requirements, and the printability level information. The online printer information, the page information, the function information, the information containing the printing requirements, and the printability level information are the same as those used in the second and the third embodiments.

The selection manner information indicates whether a higher-level printer is to be selected or a printer having a larger number of functions that satisfy the WANT requirements is to be selected when the printer is selected on the basis of the WANT requirements.

Figure 24:
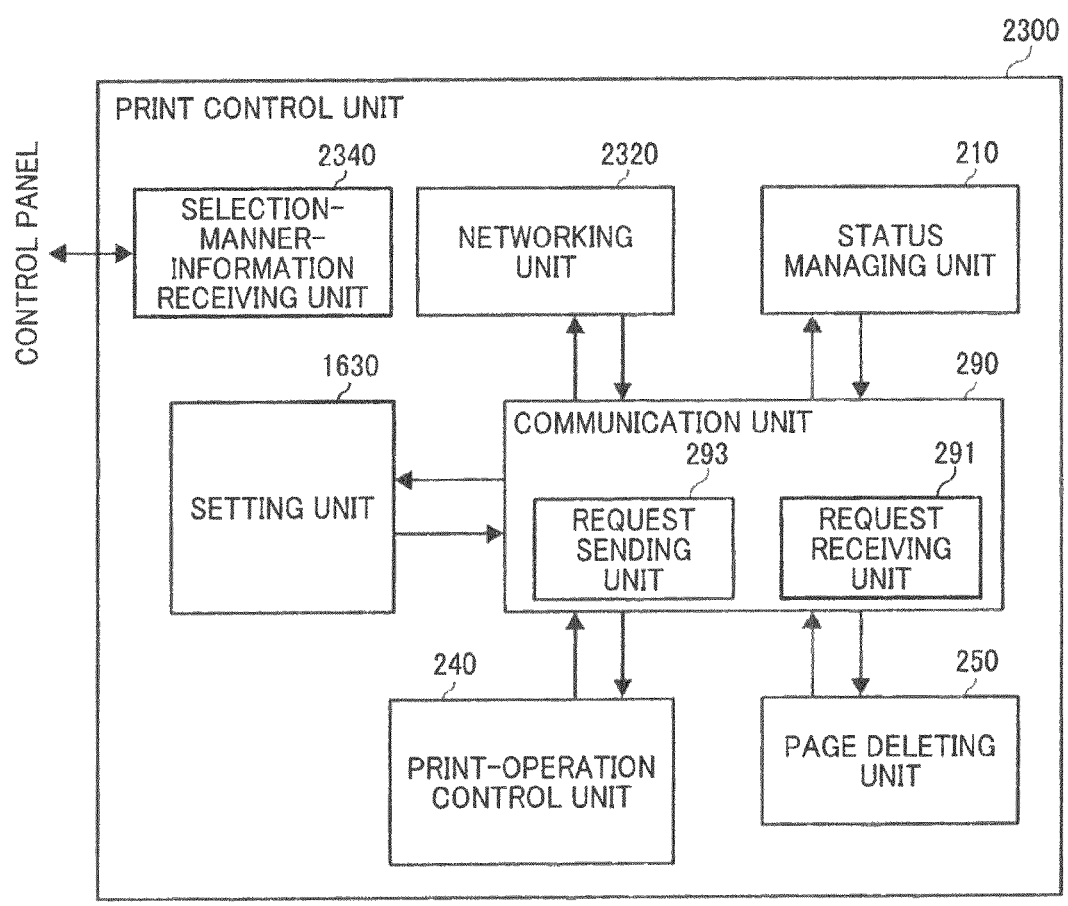
FIG. 24 is a block diagram of the functional configuration of a print control unit according to the fourth embodiment.

FIG. 24 is a block diagram of the functional configuration of the print control unit 2300 according to the fourth embodiment. The print control unit 2300 according to the present embodiment includes, as shown in FIG. 24, the status managing unit 210, a networking unit 2320, the setting unit 1630, the print-operation control unit 240, the page deleting unit 250, a selection-manner-information receiving unit 2340, and the communication unit 290. The function and the configuration of each of the status managing unit 210, the print-operation control unit 240, the page deleting unit 250, and the communication unit 290 are the same as the function and the configuration of the corresponding unit in the first to the third embodiments. The function and the configuration of the setting unit 1630 is the same as the function and the configuration of the setting unit in the second and the third embodiments.

The selection-manner-information receiving unit 2340 displays a selection manner setting screen on the liquid-crystal touch panel of the control panel 170 by default and receives the selection manner information from the user via the screen.

Figure 25:
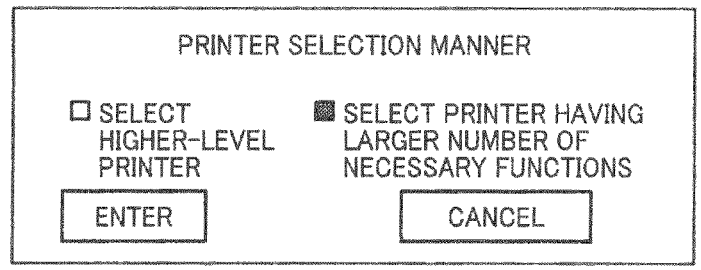
FIG. 25 is a schematic diagram of a screen displayed on a control panel for setting a printer selection manner.

FIG. 25 is a schematic diagram of a screen displayed on the control panel 170 for setting the printer selection manner. With the screen for setting the printer selection manner, the user selects either a button indicating that a higher-level printer is to be selected or a button indicating that a printer having a larger number of necessary functions is selected and presses the enter key. The selection-manner-information receiving unit 2340 then receives the instruction and stores the instruction in the storage unit 160 as the selection manner information.

Returning back to FIG. 24, during the printer selecting process, the networking unit 2320 reads the selection manner information (indicating whether a higher-level printer is to be selected or a printer having a larger number of necessary functions is to be selected) from the storage unit 160 and selects the printer that executes the print job in accordance with the selection manner information using the MUST-requirement level and the WANT-requirement level of each printer extracted from the list of printability levels.

More particularly, if no printer is present other than printers that satisfy some or none of the MUST requirements and the selection manner information indicates that a higher-level printer is to be selected, the networking unit 2320 selects the highest-level printer out of printers that satisfy all of the WANT requirements as the printer that executes the print job. If no printer is present that satisfies all of the WANT requirements, the networking unit 2320 selects the highest-level printer out of printers that satisfy some of the WANT requirements as the printer that executes the print job. In other words, in this case, the networking unit 2320 performs the printer selecting process according to the second embodiment.

If no printer is present other than printers that satisfy some or none of the MUST requirements and the selection manner information indicates that a printer having a larger number of necessary functions is to be selected, the networking unit 2320 selects a printer that has the largest number of functions that satisfy the WANT requirements out of printers that satisfy all or some of the WANT requirements as the printer that executes the print job, regardless whether the selected printer is a high-level printer or a low-level printer. In other words, in this case, the networking unit 2320 performs the printer selecting process according to the third embodiment.

Figure 26:
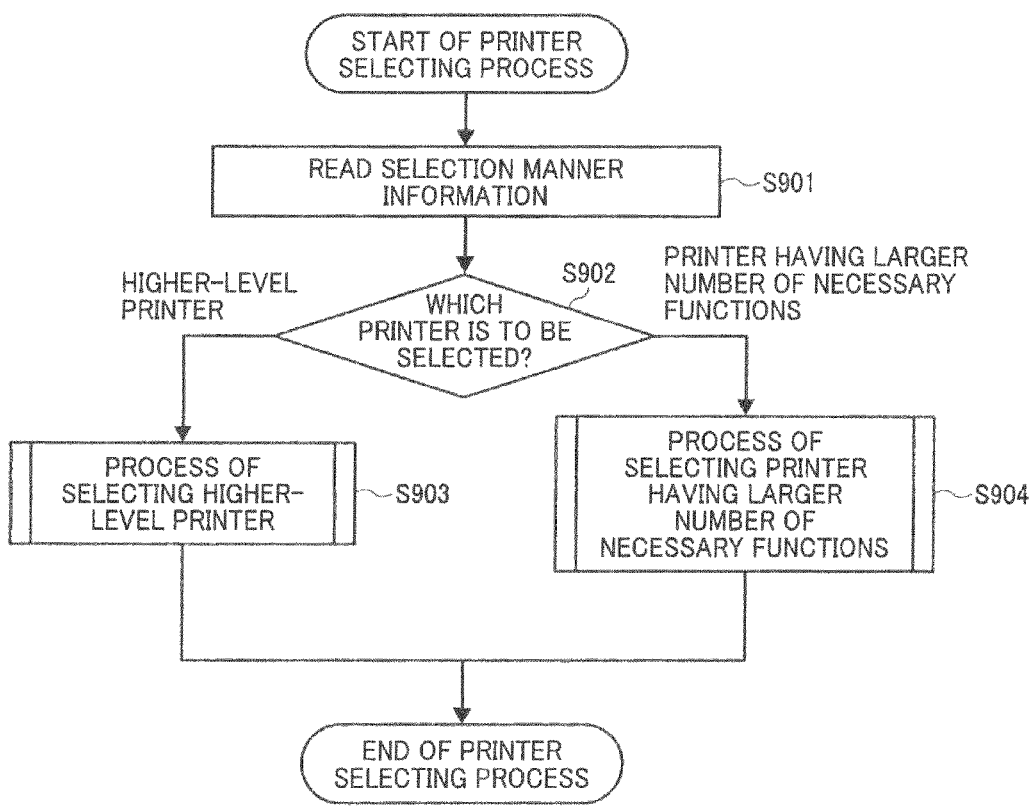
FIG. 26 is a flowchart of a printer selecting process according to the fourth embodiment.

The printer selecting process performed by the printer according to the present embodiment is described below. FIG. 26 is a flowchart of the printer selecting process according to the fourth embodiment.

The networking unit 2320 reads the selection manner information from the storage unit 160 (Step S901). The networking unit 2320 analyzes the obtained selection manner information (Step S902).

If the selection manner information indicates that a higher-level printer is to be selected (HIGHER-LEVEL PRINTER at Step S902), the networking unit 2320 performs the printer selecting process so that a higher-level printer is selected (Step S903). More particularly, the networking unit 2320 performs the printer selecting processes from Step S701 to S709 of FIG. 19 according to the second embodiment.

If the selection manner information indicates that a printer having a larger number of necessary functions is to be selected (PRINTER HAVING LARGER NUMBER OF NECESSARY FUNCTIONS at Step S902), the networking unit 2320 performs the printer selecting process so that a printer having a larger number of functions that satisfy the WANT requirements is selected (Step S904). More particularly, the networking unit 2320 performs the printer selecting processes from Step S801 to S809 of FIG. 22 according to the third embodiment.

The processes other than the printer selecting process are performed in the same manner as in the first to the third embodiments.

As described above, in the present embodiment, the user specifies the printer selection manner, i.e., whether a higher-level printer is to be selected or a printer having a larger number of functions that satisfy the WANT requirements is to be selected and the printer that executes the print job is selected in accordance with the specified printer selection manner. This selected printer is then executes the print job as an alternative printer. Therefore, the recovery printing performed in the present embodiment uses a printer that is selected more in accordance with the function's degree of user-specified importance.

Fifth Embodiment

In the fifth embodiment, in addition to the first to the fourth embodiments described above, if the printer cannot continue the printing process, the main printer performs the remaining printing process.

Figure 27:
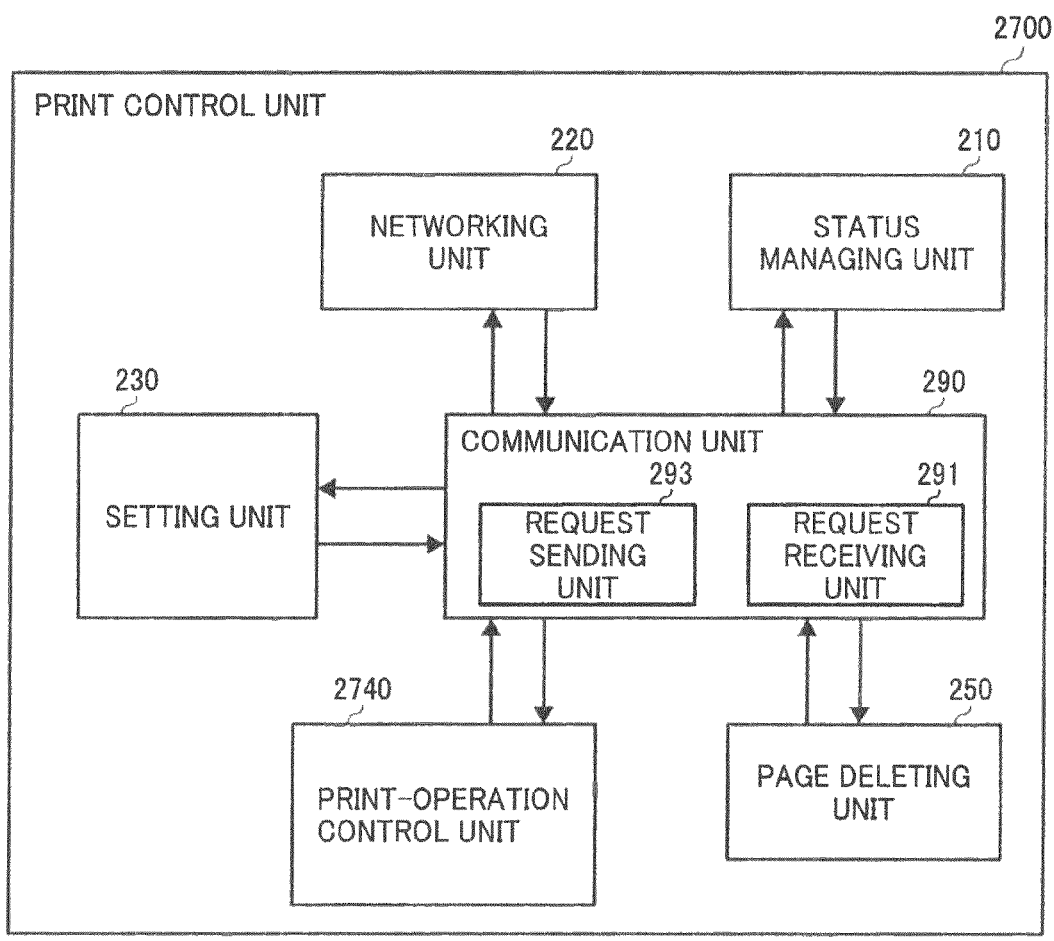
FIG. 27 is a block diagram of the functional configuration of a print control unit according to the fifth embodiment.

FIG. 27 is a block diagram of the functional configuration of a print control unit 2700 according to the fifth embodiment. The print control unit 2700 according to the present embodiment includes, as shown in FIG. 27, the status managing unit 210, the networking unit 220, the setting unit 230, a print-operation control unit 2740, the page deleting unit 250, and the communication unit 290. The function and the configuration of each of the status managing unit 210, the networking unit 220, the setting unit 230, the page deleting unit 250, and the communication unit 290 are the same as the function and the configuration of the corresponding unit used in any of the first to the fourth embodiments If an error occurs during the printing, such as a shortage of sheets, a paper jam, and a shortage of toner and the printing process is suspended, the print-operation control unit 2740 according to the present embodiment sends print suspension message and a log of the suspended print job.

Various errors, such as a shortage of sheets, a paper jam, a shortage of toner, are set as triggers for print suspension. Moreover, it is allowable to set the max number of pages. In this case, the print-operation control unit 2740 is configured to send, if the number of printed pages exceeds the max number of pages, the print suspension message.

When the main printer receives the print suspension message from a sub printer, the print-operation control unit 2740 of the main printer sends the printer disable command to the sub printer.

When the main printer receives the print suspension message from a sub printer, the print-operation control unit 2740 of the main printer sets the main printer to printable, analyzes the print log received from the sub printer together with the print suspension message, and executes part of the print job that was unprocessed due to suspension by the sub printer.

Figure 28:
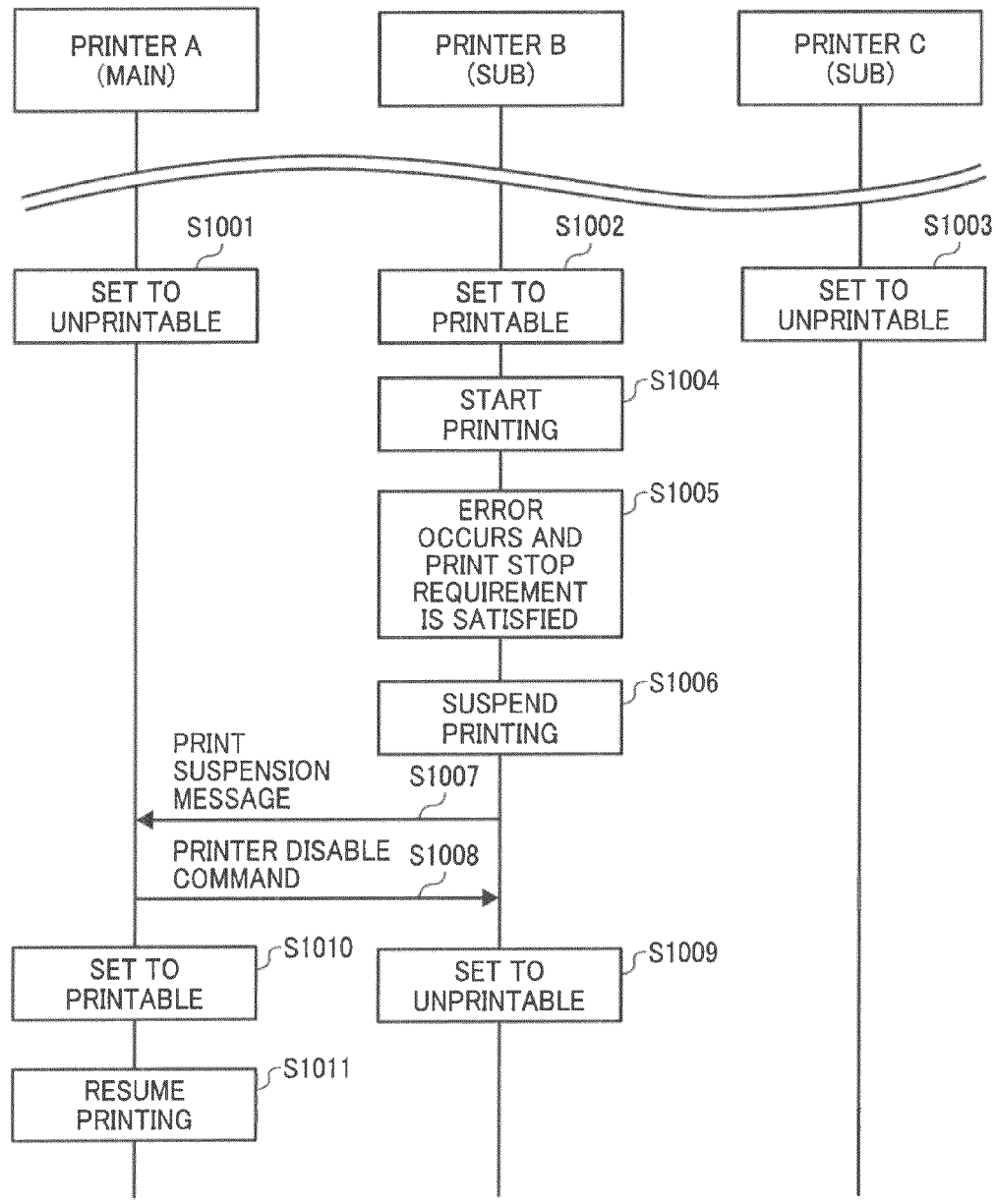
FIG. 28 is a sequence diagram of a substitutive printing process according to the fifth embodiment.

A recovery printing process according to the present embodiment is described below. FIG. 28 is a sequence diagram of the recovery printing process according to the fifth embodiment. In the example shown in FIG. 28, the printer A is the main printer, and the printers B and C are the sub printers.

The printer A selects the printer B as the printer that executes the print job. The printer A sets the printer A and C to unprintable (Steps S1001 and S1003) and sets the printer B to printable (Step S1002). The printer B starts printing (Step S1004).

If an error occurs and the print suspension requirement is satisfied when the printer B is in printing (Step S1005), the print-operation control unit 2740 of the printer B stops the printing process (Step S1006) and sends both the print suspension message and the print log to the main printer, i.e., the printer A (Step S1007).

When the printer A receives the print suspension message, the print-operation control unit 2740 of the printer A sends the printer disable command to the printer B (Step S1008). Upon receiving the printer disable command, the printer B is set to unprintable (Step S1009) and the printing stops.

In the printer A, the print-operation control unit 2740 sets the printer A to printable (Step S1010). The print-operation control unit 2740 of the printer A analyzes the received print log and executes part of the print job that was unprocessed due to suspension (Step S1011).

In this manner, if the printer cannot execute the print job any more because an error occurs and the print suspension requirement is satisfied, the main printer executes part of the print job that was unprocessed due to suspension. In other words, even when an error occurs, the alternative printer carries on the print job, which improves the printing reliability.

(Implementation Using a Computer or the Like, MFP)

Figure 29:
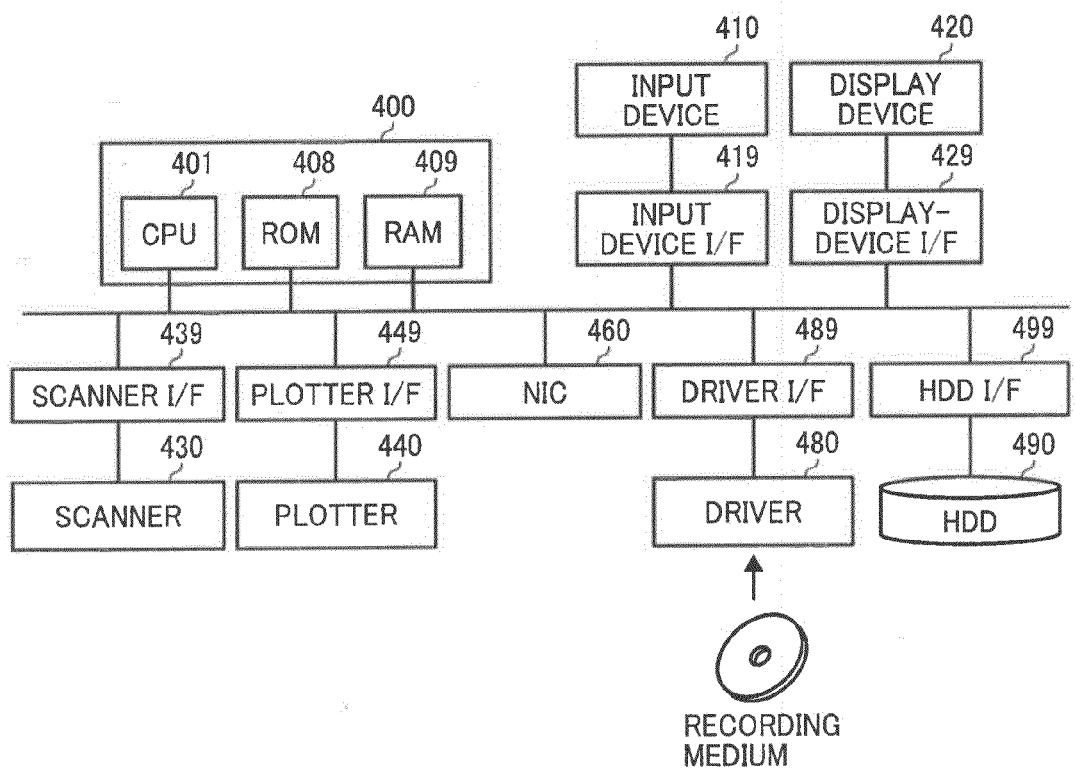
FIG. 29 is a block diagram of the configuration of a computer that implements the printer according to any of the first to the fifth embodiments.

FIG. 29 is a block diagram of the configuration of a computer that implements the printer according to any of the first to the fifth embodiments. As shown in FIG. 29, the computer includes a main processing unit 400, an input device 410, a display device 420, a scanner 430, a plotter 440, a NIC 460, a driver 480, a hard disk device (HDD) 490, an input-device I/F 419, a display-device I/F 429, a scanner I/F 439, a plotter I/F 449, a driver I/F 489, and an HDD I/F 499.

The main processing unit 400 implements various functions by executing computer programs. The main processing unit 400 includes, for example, a CPU 401, a ROM 408, and a RAM 409. The CPU 401 controls the devices of the computer by executing computer programs. The ROM 408 stores therein, for example, computer programs, parameters, etc. The CPU 401 reads the computer programs, the parameters, etc from the ROM 408. The RAM 409 is used as, for example, a work memory when the CPU 401 executes the computer programs.

The input device 410 is, for example, a keyboard or a mouse. Instructions or the like are input to the computer via the input device 410. The display device 420 displays thereon the status of the computer or the like. The scanner 430 reads an image with light and creates image data. The plotter 440 forms the image on a medium and outputs the formed image.

The NIC 460 controls the interfaces so that the computer is connected to an external device via a network. The driver 480 accepts a recording medium and reads/writes information from/to the recording medium. The HDD 490 is a storage unit that can store therein a large volume of data.

The input-device I/F 419, the display-device I/F 429, the scanner I/F 439, the plotter I/F 449, the driver I/F 489, and the HDD I/F 499 are interfaces that connect, via a bus, the main processing unit 400 to the input device 410, the display device 420, the scanner 430, the plotter 440, the driver 480, and the HDD 490, respectively.

The present invention is not limited to the above-described exemplary embodiments. The embodiments can be modified within the scope of the present invention.

As described above, the print control device according to the present invention is useful for network printing and suitable for recovery printing, in which, as an alternative image forming apparatus, an image forming apparatus is selected in accordance with a function's degree of user-specified importance.

According to the embodiments, it is possible to select an image forming apparatus in accordance with a function's degree of user-specified importance and perform substitutive printing using the selected image forming apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing system including a plurality of printers that are connected to each other via a network, the printers including a highest-level printer connected to a print server and lower-level printers, the highest-level printer comprising:
an input/output unit that receives a print job containing printing requirements set by a user from the print server and outputs the printing requirements to the lower-level printer, wherein the printing requirements includes indispensable requirements that are indispensable for executing the print job and desired requirements that are desirable for executing the print job; and
a first determining unit that compares each of the indispensable requirements and the desired requirements with function information indicative of a printing function that the highest-level printer has, so as to determine a printability level that indicates whether the highest-level printer has a printing function that satisfies any of the indispensable requirements the desired requirements, and each of the lower-level printers comprising:
a second determining unit that compares each of the indispensable requirements and the desired requirements with function information indicative of a printing function that the lower-level printer has, so as to determine a printability level that indicates whether the lower-level printer has a printing function that satisfies any of the indispensable requirements and the desired requirements; and
an output unit that outputs the printability level of the lower-level printer to the higher-level printer, wherein the highest-level printer further includes
a creating unit that merges information of the printability level of the highest-level printer and information of the printability levels of the lower-level printers to create a list of the printability levels;
a third determining unit that determines whether a printer satisfying all of the indispensable requirement is present;
a deciding unit, that when the third determining unit determines that the printer satisfying all of the indispensable requirements is present, decides on that printer as a printer that executes the print job, and when the third determining unit determines that the printer satisfying all of the indispensable requirements is not present, decides which printer to execute the job based on comparison results between each of the printers and the desired requirements; and
a print-operation control unit that sends the print job to the decided printer and causes the decided printer to execute the print job.

2. The printing system according to claim 1, wherein
the printability level is set to any of a first level, a second level and a third level, each in accordance with the function information, wherein the first level indicating that the printer satisfies all the indispensable requirements and the desired requirements, the second level indicating that the printer satisfies a part of the indispensable requirements, and the third level indicating that the printer satisfies none of the indispensable requirements, and
the deciding unit decides on, as the printer that executes the print job, a printer that satisfies all the indispensable requirements and the desired requirements.

3. The printing system according to claim 2, wherein when no printer is present that satisfies all the indispensable requirements and the desired requirements, the deciding unit decides on a printer that satisfies a part of the indispensable requirements as the printer that executes the print job.

4. The printing system according to claim 2, wherein the deciding unit decides, as the printer that executes the print job, a higher-level printer out of the lower-level printers that satisfy all of or some of the desired requirements.

5. The printing system according to claim 2, wherein the deciding unit decides, as the printer that executes the print job, a printer that has the largest number of functions that satisfy the desired requirements, the decision being made from the lower-level printers that satisfy all or some of the desired requirements and regardless of whether the decided printer is a higher-level printer or a lower-level printer.

6. The printing system according to claim 5, wherein deciding unit decides on the printer that executes the print job in accordance with decision manner information, wherein the decision manner information indicates that either a higher-level printer is to be decided on or a printer having a larger number of functions that satisfy the desired requirements is to be decided on.

7. The printing system according to claim 6, wherein
when the decision manner information indicates that a higher-level image forming apparatus is to be decided on, the deciding unit decides, as the printer that executes the print job, the higher-level image forming apparatus out of the lower-level printers that satisfy all or some of the desired requirements, and
when the decision manner information indicates that a printer having a larger number of functions satisfying the desired requirements is to be decided on, the deciding unit decides, as the printer that executes the print job, a printer that has the largest number of functions that satisfy the desired requirements out of the lower-level printers that satisfy all or some of the desired requirements.

8. The printing system according to claim 6, further comprising a decision-manner-information receiving unit that receives the decision manner information from a user.

9. The printing system according to claim 1, wherein,
when an error occurs during printing in the lower-level printer, the lower-level printer sends both a log of the print job and a message indicating that the print job is suspended to a higher-level printer, and when the lower-level printer receives a printer disable command from the highest-level printer, the lower-level printer is set to unprintable.

10. The printing system according to claim 1, wherein
when an error occurs during printing in the lower-level printer, the higher level printer receives both a log of the print job and a message indicating that the print job is suspended from the lower-level printer, the print-operation control unit sends a printer disable command to the lower-level printer and executes a part of the print job that was unprocessed due to suspension by the lower-level printer referring to the log of the print job.

11. A printing method for deciding on one of a plurality of printers that are connected to each other via a network, the printers including a highest-level printer connected to a print server and lower-level printers,
receiving, via an input/output unit of the highest-level printer, a print job containing printing requirements set by a user from the print server and outputs the printing requirements to the lower-level printer, wherein the printing requirements includes indispensable requirements that are indispensable for executing the print job and desired requirements that are desirable for executing the print job;
comparing, via a first determining unit of the highest-level printer, each of the indispensable requirements and the desired requirements with function information indicative of a printing function that the highest-level printer has, so as to determine a printability level that indicates whether the highest-level printer has a printing function that satisfies any of the indispensable requirements and the desired requirements;
comparing, via a second determining unit in each of the lower-level printers, each of the indispensable requirements and the desired requirements with function information indicative of a printing function that the lower-level printer has, so as to determine a printability level that indicates whether the lower-level printer has a printing function that satisfies any of the indispensable requirements and the desired requirements;
outputting, via an output unit in each of the lower-level printers, the printability level of the lower-level printer to the higher-level printer;
merging, via a creating unit of the highest-level printer, information of the printability level of the highest-level printer and information of the printability levels of the lower-level printers to create a list of the printability levels;
determining, via a third determining unit of the highest-level printer, whether a printer satisfying all of the indispensable requirements is present;
deciding, via a deciding unit of the highest-level printer, when the third determining unit determines that the printer satisfying all of the indispensable requirements is present, on that printer as a printer that executes the print job, and when the third determining unit determines that the printer satisfying all of the indispensable requirements is not present, decides on which printer to execute the print job based on comparison results between each of the printers and the desired requirements; and
sending, via a print-operation control unit of the highest-level printer, the print job to the decided printer and causing the decided printer to execute the print job.

12. A non-transitory computer-readable storage medium having computer readable program codes embodied in the computer readable storage medium that, when executed cause a computer to execute a printing method for deciding on one of a plurality of printers that are connected to each other via a network, the printers including a highest-level printer connected to a print server and lower-level printers, comprising:
receiving, via an input/output unit of the highest-level printer, a print job containing printing requirements set by a user from the print server and outputs the printing requirements to the lower-level printer, wherein the printing requirements includes indispensable requirements that are i-s-indispensable for executing the print job and desired requirements that are desirable for executing the print job;
comparing, via a first determining unit of the highest-level printer, each of the indispensable requirements and the desired requirements with function information indicative of a printing function that the highest-level printer has, so as to determine a printability level that indicates whether the highest-level printer has a printing function that satisfies any of the indispensable requirements and the desired requirements;
comparing, via a second determining unit in each of the lower-level printers, each of the indispensable requirements and the desired requirements with function information indicative of a printing function that the lower-level printer has, so as to determine a printability level that indicates whether the lower-level printer has a printing function that satisfies any of the indispensable requirements and the desired requirements;
outputting, via an output unit in each of the lower-level printers, the printability level of the lower-level printer to the higher-level printer;
merging, via a creating unit of the highest-level printer, information of the printability level of the highest-level printer and information of the printability levels of the lower-level printers to create a list of the printability levels;
determining, via a third determining unit of the highest-level printer, whether a printer satisfying all of the indispensable requirements is present;
deciding, via a deciding unit of the highest-level printer, when the third determining unit determines that the printer satisfying all of the indispensable requirements is present, on that printer as a printer that executes the print job, and when the third determining unit determines that the printer satisfying all of the indispensable requirements is not present, decides on which printer to execute the print job based on comparison results between each of the printers and the desired requirements; and
sending, via a print-operation control unit of the highest-level printer, the print job to the decided printer and causing the decided elected printer to execute the print job.

13. The printing method according to claim 11, wherein
when an error occurs during printing in the lower-level printer, the higher level printer receives both a log of the print job and a message indicating that the print job is suspended from the lower-level printer, the print-operation control unit sends a printer disable command to the lower-level printer and executes a part of the print job that was unprocessed due to suspension by the lower-level printer referring to the log of the print job.

14. The non-transitory computer-readable storage medium according to claim 12, wherein
when an error occurs during printing in the lower-level printer, the higher level printer receives both a log of the print job and a message indicating that the print job is suspended from the lower-level printer, the print-operation control unit sends a printer disable command to the lower-level printer and executes a part of the print job that was unprocessed due to suspension by the lower-level printer referring to the log of the print job.

* * * * *